(12) United States Patent
Fujimoto

(10) Patent No.: US 8,577,609 B2
(45) Date of Patent: Nov. 5, 2013

(54) MAP DATA, STORAGE MEDIUM, AND ELECTRONIC APPARATUS

(75) Inventor: Hidetoshi Fujimoto, Makinohara (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/367,438

(22) Filed: Feb. 7, 2012

(65) Prior Publication Data

US 2012/0203458 A1    Aug. 9, 2012

(30) Foreign Application Priority Data

Feb. 9, 2011    (JP) .................................. 2011-26063

(51) Int. Cl.
*G01C 21/34*    (2006.01)
*G08G 1/123*    (2006.01)

(52) U.S. Cl.
USPC ........................................................ 701/533

(58) Field of Classification Search
USPC ......... 701/409, 410, 424–426, 446, 454, 533; 707/609
See application file for complete search history.

(56) References Cited

U.S. PATENT DOCUMENTS

| | | | |
|---|---|---|---|
| 6,636,802 B1 | 10/2003 | Nakano et al. | |
| 7,835,860 B2 * | 11/2010 | Yamada | 701/417 |
| 2005/0058155 A1 | 3/2005 | Mikuriya et al. | |
| 2006/0106534 A1 * | 5/2006 | Kawamata et al. | 701/208 |
| 2007/0244636 A1 * | 10/2007 | Horikami | 701/208 |
| 2007/0250265 A1 * | 10/2007 | Mori | 701/211 |
| 2009/0234567 A1 * | 9/2009 | Lee | 701/200 |
| 2011/0191388 A1 | 8/2011 | Matsunaga et al. | |

FOREIGN PATENT DOCUMENTS

| | | |
|---|---|---|
| JP | A-H10-040379 | 2/1998 |
| JP | A-2000-283777 | 10/2000 |
| JP | A-2001-74482 | 3/2001 |
| JP | A-2005-345168 | 12/2005 |
| JP | A-2012-163909 | 8/2012 |

OTHER PUBLICATIONS

Office Action mailed Mar. 12, 2013 in corresponding JP Application No. 2011-026063 (and English translation).

* cited by examiner

*Primary Examiner* — Mary Cheung
(74) *Attorney, Agent, or Firm* — Posz Law Group, PLC

(57) ABSTRACT

A map data is disclosed. The map data comprises a link data and a segment data. The link data describes a characteristic of each link in a group of links on a link-by-link basis. The group of links forms a road network. The segment data relates to each segment in a group of segments on a segment-by-segment basis. The segments are defined in units of link string. Each link string is a string of multiple links and corresponds to a main road. Each link string terminates at least at an intersection of the main road. The multiple links are a part of the group of links. The segment data of each segment describes information on a storage destination of the link data corresponding to the link string that forms the each segment.

8 Claims, 15 Drawing Sheets

| 45 | 46 | 47 | 48 | 61 | 62 | 63 | 64 |
| 41 | 42 | 43 | 44 | 57 | 58 | 59 | 60 |
| 37 | 38 | 39 | 40 | 53 | 54 | 55 | 56 |
| 33 | 34 | 35 | 36 | 49 | 50 | 51 | 52 |
| 13 | 14 | 15 | 16 | 29 | 30 | 31 | 32 |
| 9 | 10 | 11 | 12 | 25 | 26 | 27 | 28 |
| 5 | 6 | 7 | 8 | 21 | 22 | 23 | 24 |
| 1 | 2 | 3 | 4 | 17 | 18 | 19 | 20 |

(ROUTE LIST)

(SEGMENT LIST)

FIG. 14A

[LINK (SEGMENT) TABLE]

| LINK (SEGMENT) NO. | LINK (SEGMENT) DETAILED ATTRIBUTE ||||| |
| --- | --- | --- | --- | --- | --- |
| | ROAD TYPE | ROAD LENGTH | SPEED LIMIT | ONE-WAY REGULATION | ... |
| 61002 | PREFECTURAL HIGHWAY | 37 | 40 | NONE | ... |
| 61353 | NATIONAL HIGHWAY | 41 | 50 | NONE | ... |
| 61354 | NATIONAL HIGHWAY | 52 | 50 | NONE | ... |

FIG. 14B

[NODE TABLE]

| NODE NO. | LINK (SEGMENT) CONNECTION COUNT | LINK (SEGMENT) CONNECTION INFO. ||||| NODE COORDINATE (x, y) | NODE DETAILED ATTRIBUTE |
| --- | --- | --- | --- | --- | --- | --- | --- | --- |
| | | CONNECTION 1 | CONNECTION 2 | CONNECTION 3 | CONNECTION 4 | ... | | |
| 1 | 4 | 61353 | 61002 | 61466 | 61003 | ... | (789,149) | ... |
| 2 | 3 | 61354 | 61312 | 61353 | | ... | (873,979) | ... |
| 3 | 2 | 61354 | 61355 | | | ... | (933,839) | ... |

MAP DATA, STORAGE MEDIUM, AND ELECTRONIC APPARATUS

CROSS REFERENCE TO RELATED APPLICATION

The present application is based on and claims priority to Japanese Patent Application No. 2011-26063 filed on Feb. 9, 2011, disclosure of which is incorporated herein by reference.

TECHNICAL FIELD

The present disclosure relates to a map data, a storage medium storing the map data, and an electronic device that performs processes using the map data.

BACKGROUND

Conventionally, an electronic apparatus performing processes based on a map data is known as an onboard apparatus (navigation system) that displays a map image on a display device, calculates a guidance route to a destination point, or gives information about roads near the traveling road (e.g., see Patent Document 1).

A known example of map data represents a road network based on connections between links, which are components of a road. This type of map data stores a link data relating to characteristics of a link such as a road length, a traffic regulation and the like on a link-by-link basis.

Another known technique of the related art hierarchically represents a road network according to levels of detail in order to represent differently scaled maps or effectively search for routes (e.g., see patent document 2). A high-level layer represents a road network by connecting high-level links, each of which is a collection of multiple links forming a road network belonging to a low-level layer. The high-level layer selectively represents a part of the road network belonging to the low-level layer, thereby representing a main road. The conventional map data hierarchically represents road networks and stores road data (including link data) on a level-by-level basis.

Patent Document 1: JP-2000-283777A
Patent Document 2: JP-2005-70482A corresponding to US 2005/0058155

However, the hierarchically-represented map data of the related art requires a complicated work when being edited. Specifically, since the map data has road data (such as link data) for respective layers, an addition of a new road or a change of an existing road requires the road data of multiple layers to be edited in order for the map data to reflect this information. For addressing this difficulty, the road data of the layers may be complied. However, simply compiling data hinders easy access to necessary information and causes an unfavorable effect on performance (including processing time) of processes such as route search and the like.

SUMMARY

In view of the foregoing, it is an objective of the present disclosure to provide a map data that is excellent in editability and/or data accessibility. It is also an objective of the present disclosure to provide a storage medium storing the map data and an electronic apparatus using the map data.

According to a first example of the present disclosure, a map data comprises a link data that describes a characteristic of each link in a group of links on a link-by-link basis. The group of links forms a road network. The map data further comprises a segment data that relates to each segment in a group of segments on a segment-by-segment basis. Segments are defined in units of link string. Each link string is a string of multiple links and corresponds to a main road. Each link string terminates at least at an intersection of the main road. The multiple links are a part of the group of links. The segment data of each segment describes information on a storage destination of the link data corresponding to the link string that forms the each segment.

According to the above map data, by referencing the segment data for a segment, it is possible access the link data relating to the segment, and it is possible to comprehend characteristics of respective links forming the segment. For example, if the link data stores information on road length, traffic regulation or the like, it is possible to acquire the information on road length, traffic regulation or the like by accessing to the link data. Therefore, it is possible to efficiently access to a desired data according to levels of detail of road network without providing road data for respective multiple levels. Data accessibility of map data improves. Additionally, it becomes possible to simplify the structure of the map data and it becomes possible to reduce retention of duplicative data. Therefore, editability of the map data improves.

According to a second example of the present disclosure, a storage medium stores therein the above-map data. According to a third example of the present disclosure, an electronic apparatus capable of reading the map data from the storage apparatus storing therein the above map data is provided. This storage medium and electronic apparatus enables an appropriate use of the above map data.

BRIEF DESCRIPTION OF THE DRAWINGS

The above and other objects, features and advantages of the present disclosure will become more apparent from the following detailed description made with reference to the accompanying drawings. In the drawings:

FIGS. 14A and 14B are diagrams illustrating a structure of a link (segment) table and a node table;

DETAILED DESCRIPTION

An embodiment will be described with reference to the accompanying drawings.

<1. Map Data Structure>

Figure 1:
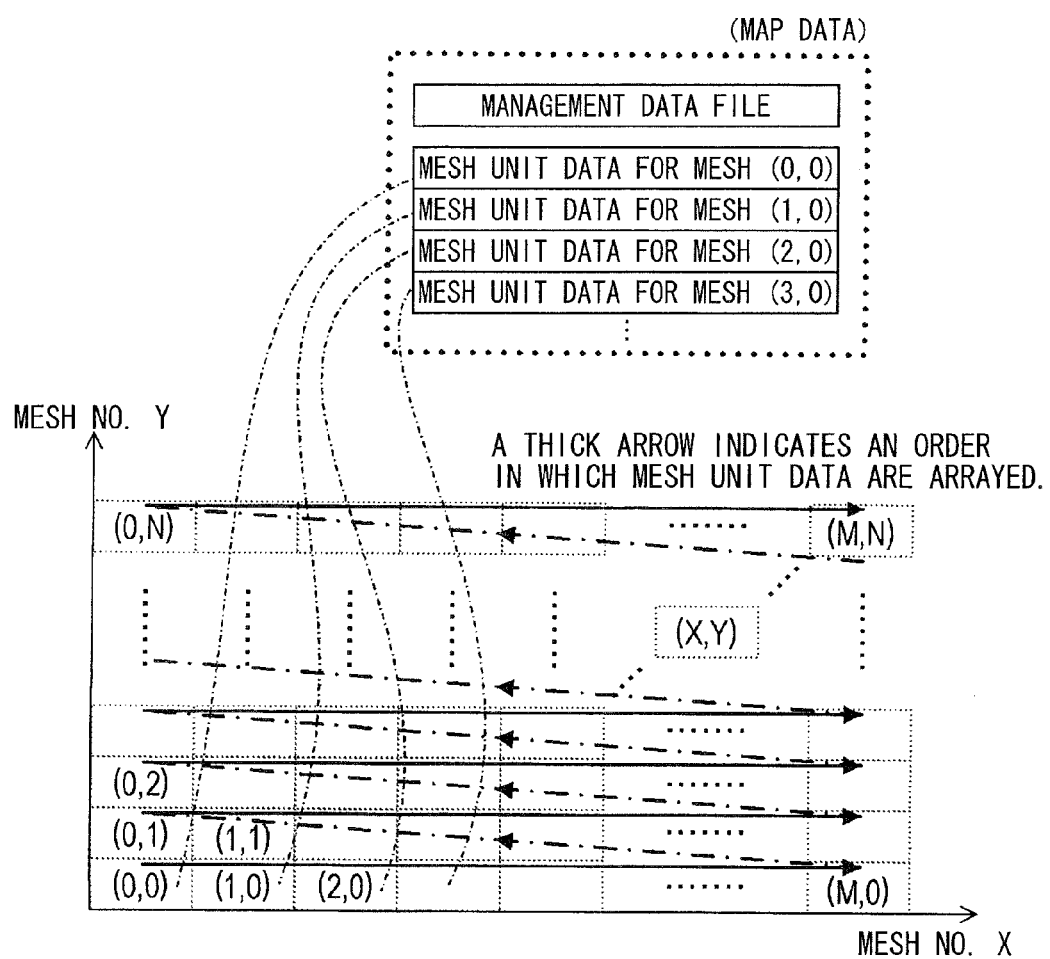
FIG. 1 is a diagram illustrating a structure of map data.

A map data of the present embodiment is installed in a navigation system (navigation apparatus) mounted on a vehicle. As shown in FIG. 1, the map data includes a group of data files. The group of data files includes data files, which are determined by subdividing a mapped area into multiple meshes, and which are simply referred to hereafter as a group of mesh-based data. The group of data files further includes a management data file that manages the group of mesh-based data.

The mesh is defined as a result of subdividing a rectangular area that contains the mapped area. With respect to each mesh, the management data file stores information about whether or not there is a mesh-based data corresponding to the mesh in the rectangular area. The mesh-based data stores information (road data) concerning a road network in the mesh. The mesh-based data is arrayed in the map data in an order corresponding to an array of the meshes.

The mesh-based data represents a road network in the mesh in terms of link connections. In the map data of the present embodiment, a link in one mesh does not extend into its adjacent mesh over a boundary and is always separated from the boundary of the one mesh. Each mesh-based data is configured to be independent of adjacent meshes. A road that crosses over between adjacent meshes is represented as a connection between links in the adjacent links at the mesh boundary.

In the following description, a node is defined as a point where multiple links are connected. A conventional node data describes information about the connection relation between links. Unlike a conventional map data, the map data of the present embodiment describes information about connection relations between links in the multiple link data such that the information about connection relations is dispersed in the multiple link data.

The map data of the present embodiment differs from a conventional one in that, for example, the mesh-based data are not provided hierarchically in accordance with levels of detail for road networks. Conventionally, road data (mesh-based data) are hierarchically provided for road networks corresponding to multiple layers (level) in accordance with levels of detail. The map data of the present embodiment stores the mesh-based data in a single layer.

<1.1 Mesh-Based Data>

The mesh-based data form a map data of the present embodiment. Each mesh is provided with one mesh-based data as a data file representing a road network in the mesh.

Figures 2, 3:
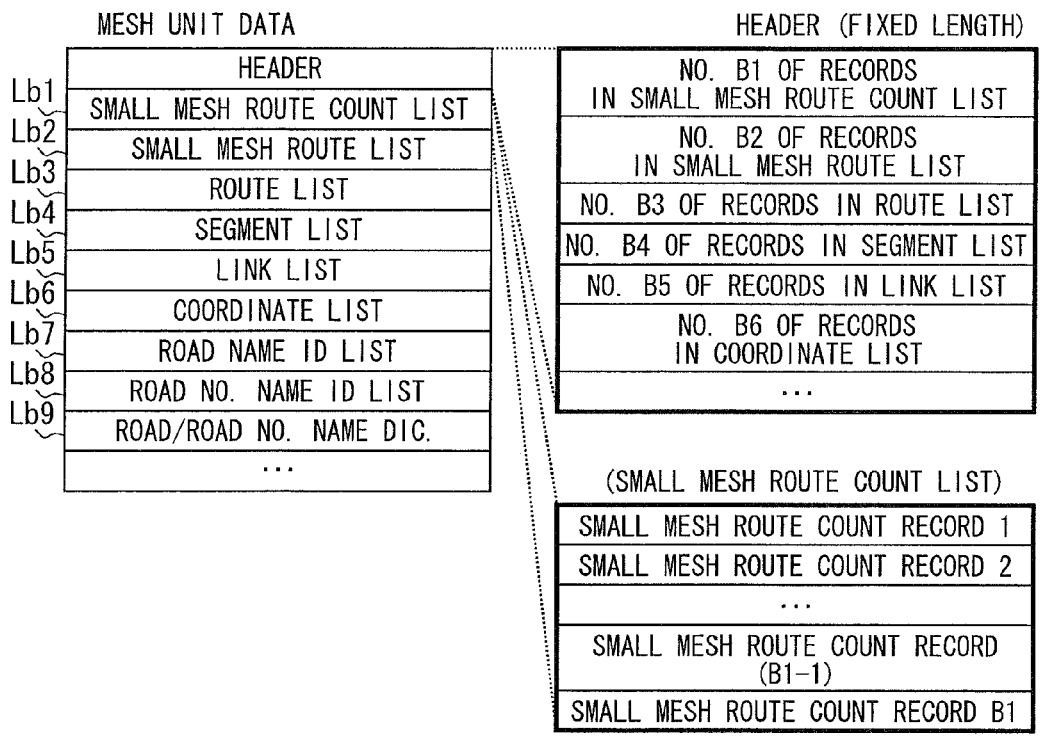
FIG. 2 is a diagram illustrating a structure of mesh-based data.
FIG. 3 is an explanatory diagram concerning a virtual mesh.

As shown in FIG. 2, the mesh-based data mainly stores: a header; a small mesh route count list Lb1 containing a group of small mesh route count records 1 to B1; a small mesh route list Lb2 containing a group of small mesh route records 1 to B2; a route list Lb3 containing a group of route records 1 to B3; a segment list Lb4 containing a group of segment records 1 to B4; a link list Lb5 containing a group of link records 1 to B5; a coordinate list Lb6 containing a group of coordinate records 1 to B6; a road name ID list Lb7 containing a group of road name ID records 1 to B7; a road number name ID list Lb8 containing a group of road number name ID records 1 to B8; and a road/road-number-name dictionary Lb9. The small mesh route count record is also called a small mesh route count data. The small mesh route record is also called a small mesh route data. The route record is also called a route data. The segment record is also called a segment data. The link record is also called a link record. The coordinate record is also a coordinate data. The road name ID record is also called a road name ID data. The road number name ID record is also called a road number name ID data.

<1.2 Detail of Mesh-Based Data>

<1.2.1 Header>

The header stored in the mesh-based data defines the configuration of the mesh-based data and is represented in fixed length. Specifically, the header contains information indicating sizes of the data lists (Lb1 to Lb9) in an order in which the data lists (Lb1 to Lb9) are stored in the mesh-based data. The data lists Lb1 to Lb8 contain groups of fixed-length records. The size of each of these data lists is described as the number of records in the data list. The data list Lb9 contains a group of variable-length records. The size of this data list is described as information about its data size (number of bytes). As shown in FIG. 2, the header sequentially describes information such as record count B1 in the small mesh route count list Lb1, record count B2 in the small mesh route list Lb2, record count B3 in the route list Lb3, record count B4 in the segment list Lb4, record count B5 in the link list Lb5, and record count B6 in the coordinate list Lb6.

<1.2.2 Small Mesh Route Count Record>

The fixed-length small mesh route count record, which forms the small mesh route count list Lb1, indicates the number of routes in a virtual small mesh.

The virtual small mesh will be described in detail. The map data of the present embodiment uses a concept of a virtual mesh. The virtual mesh is defined as a result of further subdividing a mesh corresponding to each mesh-based data. As shown in FIG. 3, the present embodiment defines the virtual mesh by dividing a mesh corresponding to each mesh-based data into 64 portions.

The virtual mesh is expressed as "virtual" for the following reasons. A data corresponding to the virtual mesh is not configured as an independent data file like the mesh-based data. In addition, a link is not divided at boundary of the virtual mesh. A data is not clearly separated and managed with reference to the boundary of the virtual mesh. From this viewpoint, the virtual mesh is distinguished from the mesh corresponding to the mesh-based data.

One virtual mesh according to the above-mentioned definition forms the virtual small mesh. In addition, the present embodiment defines a virtual medium mesh as an area of 16 virtual small meshs separated by a dash-dot line as shown in FIG. 3. This will be described later.

Figure 4A:
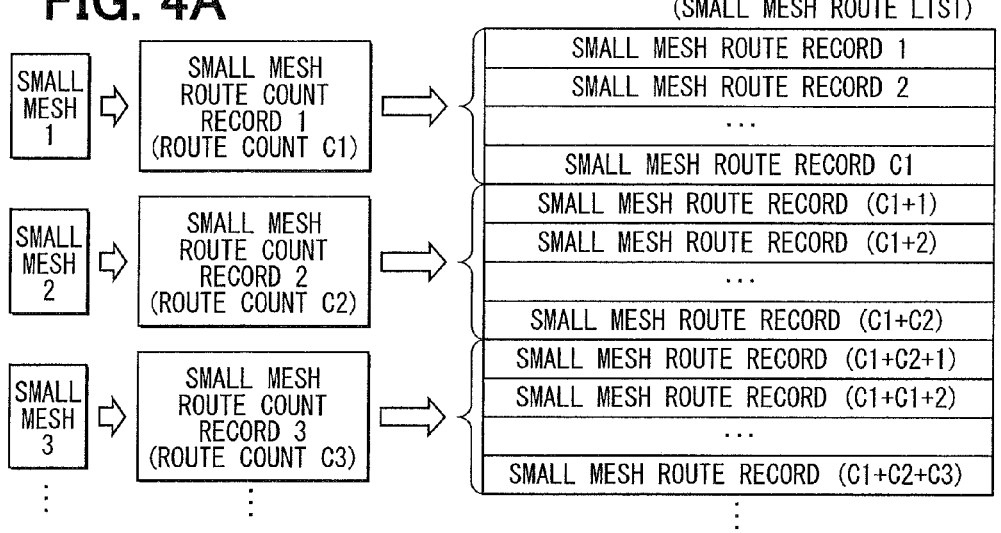
FIGS. 4A to 4C are explanatory diagrams concerning a small mesh route count and a small mesh route record.

The small mesh route count record represents the number of routes in a virtual small mesh according to the above-mentioned definition and is provided for each virtual small mesh. As shown in FIG. 4A, with respect to each virtual small mesh in the mesh, the small mesh route list stores the number of small mesh route records equal to the number of routes represented by the small mesh route count record. FIG. 4A shows a correspondence relation between the small mesh route record and the small mesh route count record.

<1.2.3 Small Mesh Route Record>

The following describes the small mesh route records forming the small mesh route list Lb2. As shown in FIG. 4A, with respect to each virtual small mesh, the small mesh route records is provided for respective routes included in the virtual small mesh. The small mesh route list Lb2 stores a g group of small mesh route records of the virtual small mesh in an order in which to the corresponding small mesh route count records in the small mesh route count list Lb1.

Figure 4B:
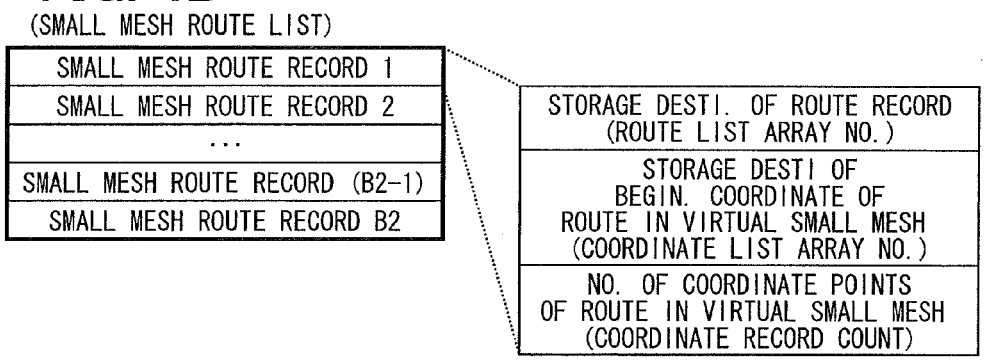

As shown in FIG. 4B, the small mesh route record is a fixed-length record containing: information indicating a storage destination of a route record corresponding to the route described in this record; information indicating a storage destination of a coordinate record corresponding to the beginning of an area (route portion) where the route passes through the virtual small mesh; and information about the number of coordinate points (total number of coordinate records) corresponding to the area (route portion) where the route passes through the virtual small mesh. FIG. 4B shows the configuration of a small mesh route record.

Specifically, the above-mentioned "information indicating a storage destination of a route record" is described as information about an array number (also called "route list array number") in the route list Lb3 containing route records. For example, let us suppose that the corresponding route record is stored α-th from the beginning in the route list Lb3. In this case, the small mesh route record describes value α as the "information indicating a storage destination of a route record."

Similarly, the above-mentioned "information indicating a storage destination of a coordinate record" represents an array number (also called a coordinate list array number) in the coordinate list Lb6 containing coordinate records. For example, let us suppose that the corresponding coordinate record is stored β-th from the beginning in the coordinate list Lb6. In this case, the small mesh route record describes a value α as the "information indicating storage destination of a coordinate record."

Figure 4C:
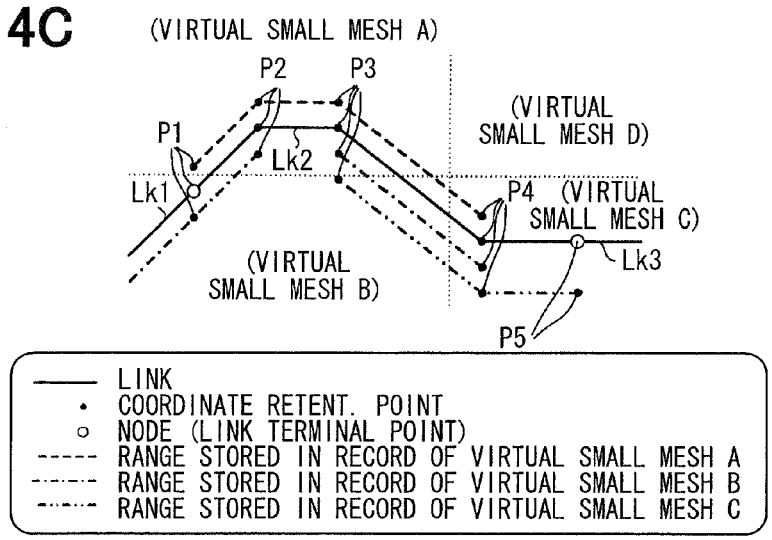

The above-mentioned "area (route portion) where the route passes through the virtual small mesh" is defined as follows. As shown in FIG. 4C, the route contains sequentially connected links Lk1, Lk2, and Lk3. The link Lk2 follows the link Lk1 in a virtual small mesh B and passes through virtual small meshs A, B, and C, and then is connected to the link Lk3 in the virtual small mesh C. A white dot in FIG. 4C represents a connection point (node) between links. The connection point between the links Lk1 and Lk2 is positioned in the virtual small mesh B. The connection point between the links Lk2 and Lk3 is positioned in the virtual small mesh C. A black dot in FIG. 4C represents a coordinate point that is stored as the coordinate record in the map data. Like the black point, coordinate points at the white dots (connection point between links) are also stored. In the present disclosure, these points are represented as coordinate retention points P1 to P5.

The above-mentioned "area (route portion) where the route passes through the virtual small mesh" is classified into a first-type area (route portion) and a second-type area (route portion). The small mesh route record is provided for the first-type area and the second-type area with respect to each virtual small mesh and each route.

The first-type area is defined as an area connecting one area (route portion) and the other area (route portion). The one area (route portion) connects coordinate retention points that are positioned in the virtual small mesh of the route. The other area (route portion) connects a coordinate retention point positioned at the end of the one area (route portion) to another coordinate retention point that is adjacent to the end-positioned coordinate retention point and is positioned outside the virtual small mesh. In other words, the first-type area, which is the first type of "area (route portion) where the route passes through the virtual small mesh", is defined as an area formed by connecting coordinate retention point inside the virtual small mesh of the route and the coordinate retention point outside the virtual small mesh.

The second-type area (route portion) is defined an area (route portion) connecting adjacent coordinate retention point in cases where the adjacent coordinate retention points are connected to each other while crossing over another virtual small mesh. Specifically, the second-type area, which is the second type of "area (route portion) where the route passes through the virtual small mesh", is defined as the "area (route portion) where the route passes through the virtual small mesh" that concerns the virtual small mesh to be passed through (e.g., the virtual small mesh B which are passed through by the coordinate retention points P3 and P4).

More specifically, as shown by an example in FIG. 4C, the route connecting the links Lk1, Lk2, and Lk3 has an area (route portion) passing through the virtual small mesh A is set to an area (route portion) connecting the coordinate retention points P1, P2, P3, and P4. A small mesh route record corresponding to the virtual small mesh A of this route describes information about the storage destination of the coordinate record corresponding to the beginning of the area through which the this route passes, so that the information includes (i) the coordinate list array number of the coordinate retention point P1 and (ii) a value of 4 indicating the total number of coordinate records. In the above, the coordinate list array number of the coordinate retention point P1 is the smallest coordinate list array number in the coordinate list Lb6 among the coordinate retention points P1, P2, P3, and P4.

The coordinate list Lb6 of the present embodiment contains the coordinate records. The coordinate records are provided to represent coordinates values at respective point on the route indicated by a route record, and are arrayed in the coordinate list Lb6 in an order corresponding to the route record. Specifically, the group of coordinate records corresponding to the route are arrayed so that points corresponding to the coordinate records travel the route in one direction along the route.

As shown in FIG. 4C, for the route, two small mesh route records corresponding to the virtual small mesh B are prepared. A first small mesh route record describes information (coordinate list array number) indicating the storage destination of the coordinate record corresponding to the beginning of a certain area (route portion). This certain area connects the coordinate retention point P1, the coordinate retention point P2 and a point (not shown) traced back from the coordinate retention point P1, and servers as an area (route portion) passing through the virtual small mesh B for the route. A second small mesh route record describes a coordinate list array number corresponding to the coordinate retention point P3 as information indicating the storage destination of the coordinate record corresponding to the beginning of a certain area (route portion). This certain area connects the coordinate retention points P3 and P4, and also serves as the area (route portion) passing through the virtual small mesh B for the route. The small mesh route record also describes the value of 2 as the information indicating the total number of coordinate records. Alternatively, the information may be collectively described from the starting point to P1, P2, P3, and P4.

The area (route portion) corresponding to the virtual small mesh C for the route is set to an area (route portion) connecting the coordinate retention points P3, P4, P5 and a coordinate retention point (not shown) located downstream of the same route. The small mesh route record describes the array number of the coordinate record for the coordinate retention point P3 as the information indicating the storage destination of the coordinate record corresponding to the beginning of the area (route portion) passing through the virtual small mesh C for the route. In the above, the coordinate retention point P3 has the smallest coordinate list array number in the coordinate list Lb6 among the coordinate retention points P3, P4, P5.

<1.2.4 Route Record>

The route record manages a link string in the mesh as a set of links appropriate for route guidance. The route record contains attribute information, which is information about the route. The route record defines a link string belonging to the same route. For example, a "route" is defined as a straight connected link string having the same road name and/or the same road number.

Figure 5A:
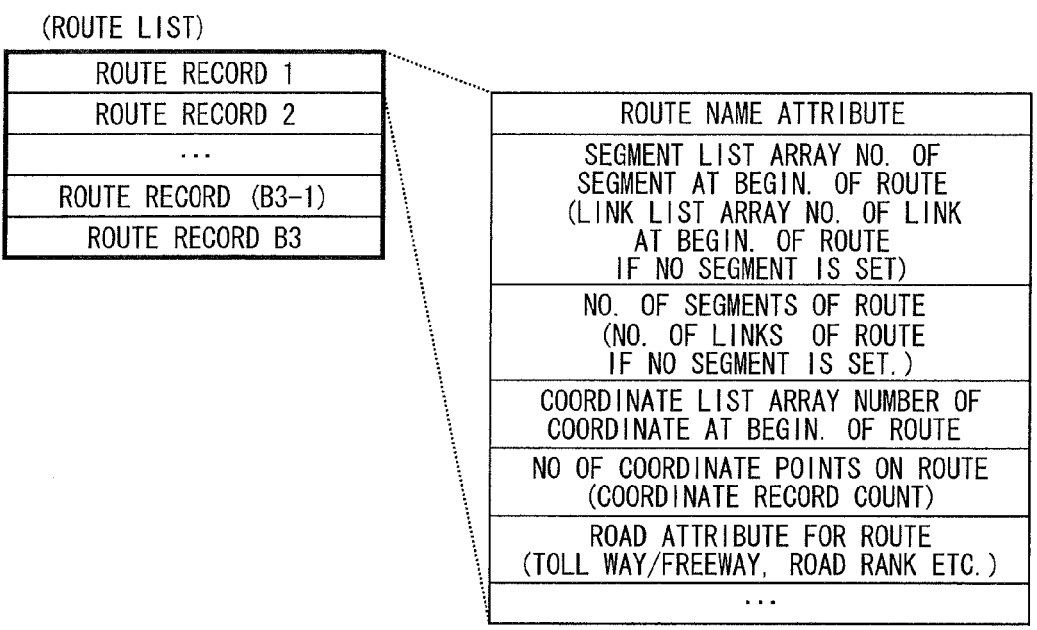
FIGS. 5A to 5D are diagrams illustrating a structure of route records, segment records, link records, and coordinate records.

Specifically, as shown in FIG. 5A, the route record contains: a name attribute of the description target route; a road attribute of this route; a coordinate list array number of the coordinate record corresponding to a beginning of this route; a coordinate record count corresponding to the route; an array number (hereafter referred to as a segment list array number) of the segment record in the segment list Lb4 that corresponds to the segment at a beginning of this route; and information about a segment count in this route. FIG. 5A is a diagram illustrating a configuration of the route record Specifically, the route record provides the above-mentioned "name attribute" as information capable of specifying storage positions of a road name ID record and a road number name ID record that correspond to this route. The road name ID record and the road number name ID are contained in the road name ID list Lb7 and the road number name ID list Lb8, respectively. The road name ID record indicates a location of the corresponding road name in a road/road-number-name dictionary, in which the corresponding road name is registered. The road name number ID record indicates a location of the corresponding road number in the road/road-number-name dictionary, in which the corresponding road number name is registered. Each of the road name ID record and the road name number ID record is fixed-length. Registered words in the road/road-number-name dictionary are stored as variable-length records.

In addition, the "name attribute" of the route record further includes information indicating whether the route is a toll road or a non-toll road, information indicating which road rank the route belongs, and the like. In the present embodiment, the routes are classified in to any one of road ranks. The road ranks include toll road, national highway, prefectural highway, narrow street, other ordinary roads, and/or the like. This information is described as the "road attribute" in the route record.

The information about the "coordinate list array number of the coordinate record corresponding to the beginning of the route" and the "coordinate record count" described in the route record are used to specify a certain coordinate record string in the coordinate list Lb6. The certain coordinate record string is a string of coordinate records indicative of coordinates of the corresponding points on the route. As described above, in the coordinate list Lb6, the coordinate records representing the coordinate points on the route are arrayed along a direction of the route. Accordingly, it is possible to specify the coordinate records corresponding to the route by using the information about the "coordinate list array number of the coordinate record corresponding to the beginning of the route" and the "coordinate record count."

The information about the "segment list array number corresponding to the segment at the beginning of the route" and the "segment count in the route" described in the route record are used to specify certain segment records in the segment list Lb4. The certain segment records correspond to a segment string, which is a string of segments configuring the route record.

Figures 6A, 6B:
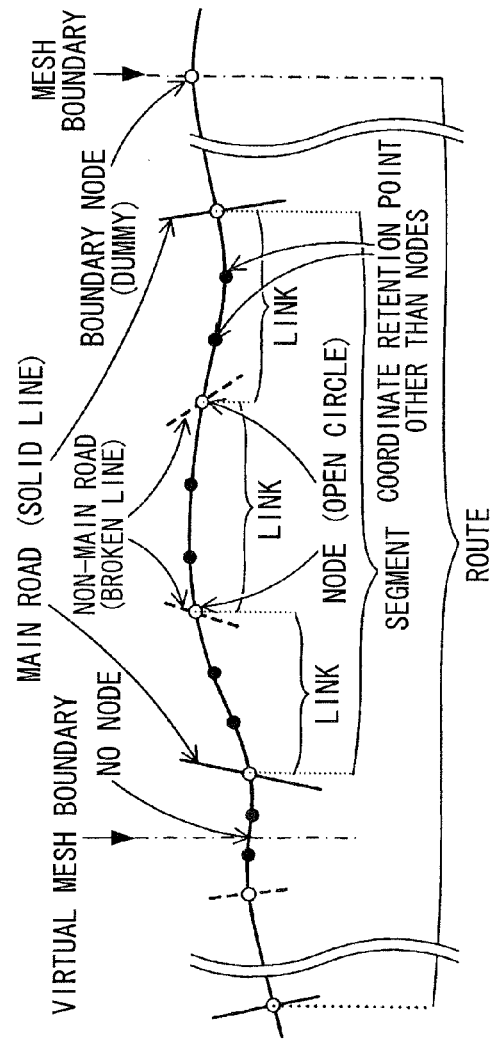
FIGS. 6A and 6B are diagrams illustrating a relation among route records segment records, link records, and coordinate records.

Next, the segment will be described. In the present embodiment, the segments are defined in units of link string. The link string is a string of multiple links that correspond to a main road and that are a part of the group of links forming the road network. As shown in FIG. 6A, the link string terminates at least at an intersection of the main road. This segment is defined so as not to extend from one route defined in the route record into another route defined in another route record. That is, the segment corresponds to each of multiple link sets, into which a series of links forming one route defined in the route record is divided. FIG. 6B shows a correspondence relation between a route record and a segment record. Basically, one route record is provided with multiple segment records. However, the segment may contain all the series of links forming the one route defined in the route record. That is, one segment record may be associated with one route record.

The segment can be a replacement for what is called "high-level link" used in a conventional map data. In the present embodiment, a segment is not defined for a route that is not the main road. The segment is not defined only for a route that is the main road. That is, only the route record corresponding to the main road describes the information about the "segment list array number corresponding to the segment at the beginning of the route" and the "segment count in the route." The route record corresponding to the route that is not the main road describes an array number (called also "link list array number") of a certain link record in the link list Lb5 and the number of links forming this route instead of the segment list array number and the segment count. In the above, the certain link record corresponds to the link at the beginning of this route.

Like the coordinate records, the segment list Lb4 arrays segment records corresponding to the segments, so that the segment records are arrayed along the route. Specifically, in the segment list Lb4, the segment records corresponding to the segments are arrayed in a segment record array order, which corresponds to an order in which the coordinate records are arrayed in the coordinate list Lb6 and which also corresponds to an order in which the route records are arrayed in the route list Lb3. Accordingly, the segment records corresponding to the segments forming the route can be specified using the information about the "segment list array number corresponding to the segment at the beginning of the route" and the "segment count in the route."

As will be described in detail below, the segment record count B4 and the record array in an order of road ranks can be used to determine whether or not the link list array number and the link count are described instead of the segment list array number and the segment count.

<1.2.5 Segment Record>

As described above, the segments records are provided for respective segments, which are defined in units of link string. Each link string is a string of multiple links that correspond to a main road, are a part of the group of links forming the road network, and terminate at least at the intersection of the main road.

According to the present embodiment, a road network of main road (also called "main road network") is represented by connected segments. A connection between segments represents an intersection of the main road. The segment data of the segment terminating at the intersection of the main road includes information capable of specifying link records of the link string forming the corresponding segment.

Figure 5B:
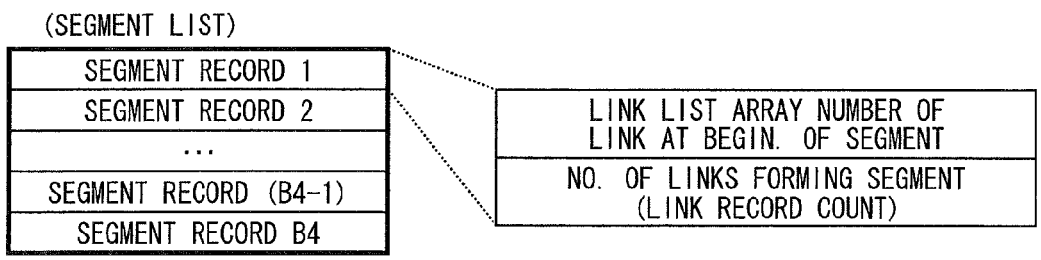

FIG. 5B is a diagram illustrating a configuration of the segment record. The segment record includes information about an array number (link list array number) of a certain link record in the link list Lb5 and the number of links forming the segment. The certain link record corresponds to the link positioned at the beginning of the link string forming the segment.

Like the coordinate records, the link list Lb5 arrays the link records corresponding to the links along the route. Specifically, in the link list Lb5, the link records corresponding to the links are arrayed in a link record array order, which corresponds to an order in which the coordinate records are arrayed in the coordinate list Lb6 and which also corresponds to an order in which the route records are arrayed in the route list Lb3. Accordingly, the link records of the links forming the segment can be specified using the information about the "link list array number of the link record corresponding to the link at the beginning of the link string forming the segment" and the "number of links forming the segment."

Figure 7:
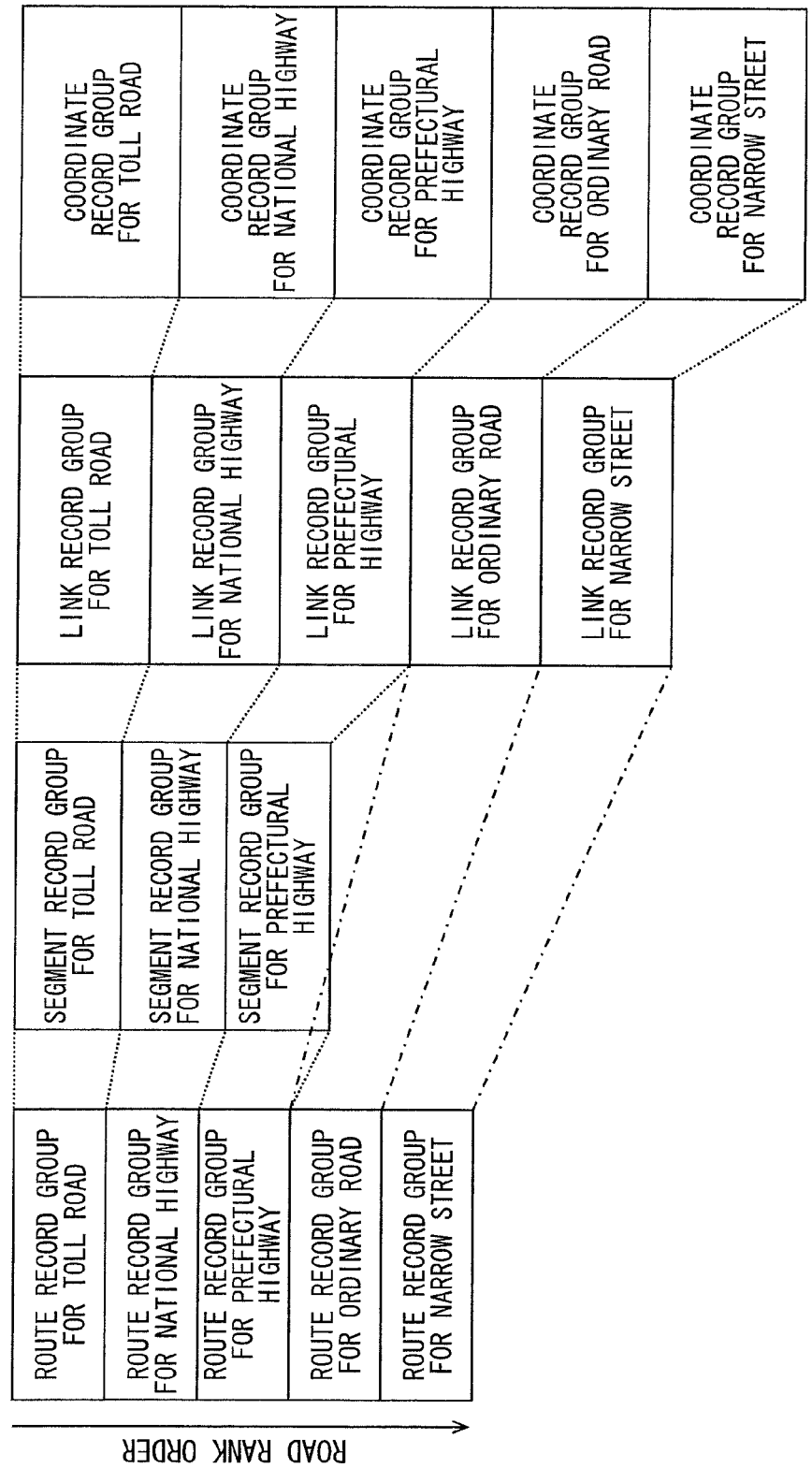
FIG. 7 is a diagram illustrating an order in which route records, segment records, link records, and coordinate records are arrayed.

For example, the "main road" represents a road whose road rank belongs to any one of "toll road," "national highway" and "prefectural highway." In this case, the segment is set to a link string corresponding to "toll road," "national highway," or "prefectural highway". The segment is not set to a link string corresponding to "ordinary road" or "narrow street." As shown in FIG. 7, the segment list Lb4 stores the segment records corresponding to roads whose road rank belongs to "toll road," "national highway," or "prefectural highway." The segment list does not store segment records corresponding to roads whose road rank belongs to "ordinary road" or "narrow street." It should be noted that, when the road ranks are classified into two road rank groups based on a criterion whether high-speed travel is possible, the "main road" described herein denotes a road belonging to one road rank group appropriate for high-speed travel. Depending on criterion, the main road may include "ordinary road" or may exclude "prefectural highway," for example.

<1.2.6 Link Record>

Next, the link record will be described below. The link record is provided to correspond to each link in a mesh. The link record of the link includes information representing characteristics of the link. In the present embodiment, the link record of the link further includes information representing the connection relation with another link at both terminations of the link.

Figure 5C:
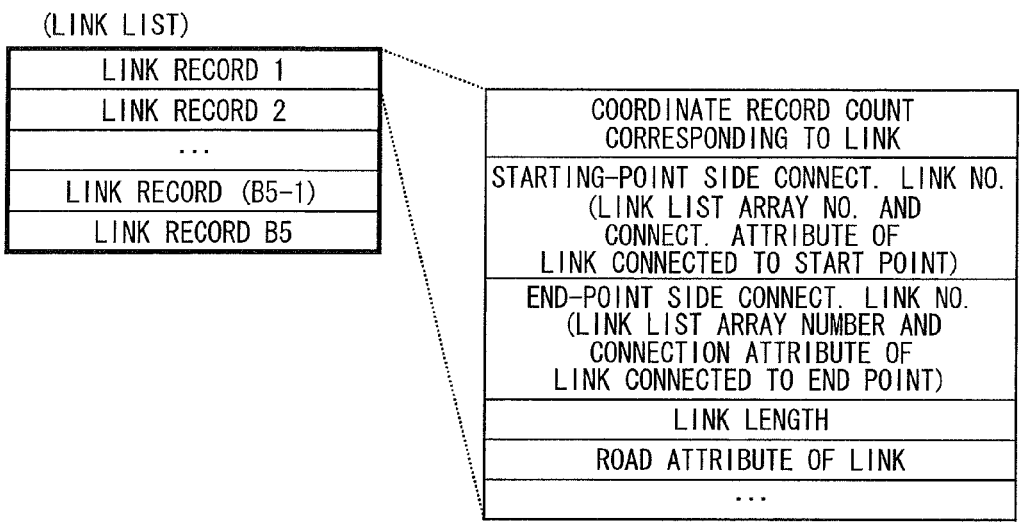

FIG. 5C is a diagram illustrating a configuration of the link record. As shown in FIG. 5C, the link record of the link stores: information representing a connection relation with another link connected to a starting point of the link; information representing a connection relation with another link connected to an end point of the link; information capable of specifying a certain group of coordinate records in the coordinate list Lb6 wherein the certain group represents coordinates at points on the link; a link length; and information about another road attribute of the link such as traffic regulation (e.g., one-way traffic), the number of lanes, a legal speed (e.g., speed limit), a presence and absence of a traffic light at an intersection corresponding to an termination point of the link, and the like.

The link has a predetermined direction, which is determined by an order in which the corresponding group of coordinate records are arrayed in the coordinate list Lb6. The starting point and the end point of the link correspond to one termination point and the other termination point of the link, respectively. The one termination point corresponding to the starting point has a smaller array number in the coordinate list Lb6 than the other termination point corresponding to the end point. Note that the one termination point and the other termination point of the link are opposite termination points of the link.

The "information representing the connection relation with another link connected to the starting point of the link" includes a starting point side connection link number and starting point side connection attribute information. The starting point side connection link number is a link list array number of a link record that corresponds to another link connected to the starting point of the link. The starting point side connection attribute information represents a connection attribute at the starting point of the link. The "information representing the connection relation with another link connected to the end point of the link" includes an end point side connection link number and end point side connection attribute information. The end point side connection link number is the link list array number of a link record corresponding to another link connected to the end point of the current link. The end point side connection attribute information represents a connection attribute at the end point of the link.

As the starting point side connection link number, the link record of the link describes only one of other links (multiple links) connected to the starting point of the link. In the above, the one of the other links meets a predetermined rule. Similarly, as the end point side connection link number, the link record describes only one of other links connected to the end point of the link. In the above, the one of other links connected to the end point of the link meets a predetermined rule. A description manner of a link connection relation including this point will be described in detail.

In the link record, the starting point side connection attribute information is described together with the starting point side connection link number. The starting point side connection attribute information of the link record indicates whether the starting point of the self-link (the link of the discussing link record) is connected to the starting point or the end point of a link corresponding to the starting point side connection link number. That is, the starting point side connection attribute information has a value representing "starting point" or "end point." If the starting point of the link is not connected to another link in the same mesh, the link list array number of the self-link is described as the starting point side connection link number and a value representing the "starting point" is described as the starting point attribute information. Cases where the starting point of the link is not connected to another link in the same mesh include a case where the link starting point is a dead, a case where the starting point of the link is a node (boundary node) positioned at the boundary with an adjacent mesh and is connected only to a link in the adjacent mesh.

Since the mesh-based data is a closed data in the present embodiment, only a link connection relation in the self-mesh (the mesh corresponding to the discussing link record) is described in the link record even if the self-link has a connection relation with a link in an adjacent mesh, which is connected through the boundary node positioned at the boundary with the adjacent mesh.

Similarly, the end point side connection attribute information is described together with the end point side connection link number. The end point side connection attribute information indicates whether the end point of the self link is connected to the starting point or the end point of the link corresponding to the end point side connection link number. If the link end point is not connected to another link in the same mesh, the link list array number of the self-link is described as the end point side connection link number and a value representing the "end point" is described as the end point attribute information.

The link record describes the "information capable of specifying a certain group of coordinate records in the coordinate list Lb6 wherein the certain group represents coordinates at points on the link". This information includes, for example, information about the number of coordinate points configuring the link record. The use of such information requires that the coordinate records be arrayed in the coordinate list Lb6 in an order corresponding to the link records in the link list Lb5. When there is this kind of relation between an array of link records in the link list Lb5 and an array of coordinate records in the coordinate list Lb6, it is possible to specify the coordinate records corresponding to each link record by referencing the information about the number of coordinate points described in each link record from the beginning of the link list Lb5.

Alternatively, the "information capable of specifying a certain group of coordinate records in the coordinate list Lb6 wherein the certain group represents coordinates at points on the link" may include a coordinate list array number corresponding to the coordinate record of the beginning of this link and information about the number of coordinate records corresponding to this link. With use of this description also, the coordinate records corresponding to the link record can be specified.

<1.2.7 Coordinate Record>

Figure 5D:
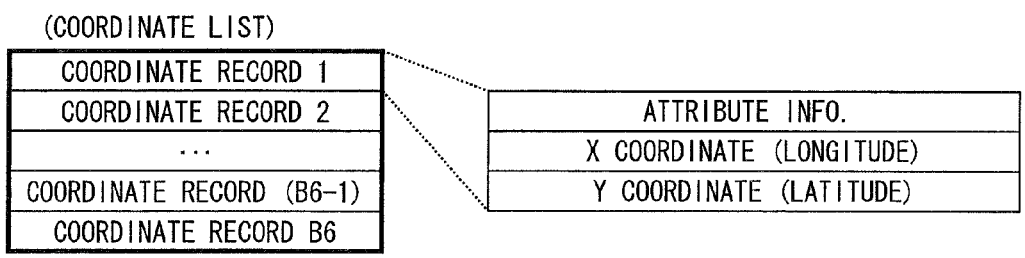

With respect to each terminal point and shape interpolation point of a link, the coordinate list Lb6 contains a coordinate record representing position coordinates (latitude and longitude) at the point. FIG. 5D is a diagram illustrating a configuration of a coordinate record. Specifically, the coordinate record contains information about the X coordinate (latitude) and the Y coordinate (longitude) as position coordinates for the corresponding point. The coordinate record further contains attribute information about the point. The attribute information described in the coordinate record contains information representing type of the corresponding point. This information categorizes the corresponding point into any one of predetermined types such as a shape interpolation point, a node, a boundary node provided at the mesh boundary, and the like.

<1.2.8 Data Array>

With reference to FIG. 7, description is given on an array of route records 1 to B3 in the route list Lb3, an array of segment records 1 to B4 in the segment list Lb4, an array of link records 1 to B5 in the link list Lb5, and an array of coordinate records 1 to B6 in the coordinate list Lb6.

According to the present embodiment, the route records corresponding to respective routes in the mesh are arrayed in the route list Lb3 in the order of road ranks. For example, the route records corresponding to the road ranks are collectively arrayed in the route list Lb3 in the following order: toll road, national highway, prefectural highway, ordinary road, and narrow street. The order of road ranks matches the degree of importance in high-speed travel. According to the present embodiment, a reason for the above order of road ranks is, for example, that the route calculation or the like typically aims at an optimum route for one to reach the destination point in the possible shortest period of time, and that the records belonging to the road ranks appropriate for high-speed travel are frequently accessed in route calculation or the like. In addition, since a map image drawing process may not display narrow streets depending on map scales, the data for narrow roads are less frequently accessed. For these reason, the route records are arrayed in the road rank order in the present embodiment.

This data array in the order of road ranks also applies to the segment list Lb4, the link list Lb5, and the coordinate list Lb6.

In the segment list Lb4, the segment records for respective segments forming the route corresponding to the route record are arrayed in an order corresponding to the route record as described above (see FIGS. 6B and 7). For example, the segment records are arrayed in the segment list Lb4 in an order corresponding to the direction of the route.

Similarly to the segment records, the link records of the links configuring the route corresponding to the route record are arrayed in the link list Lb5 in an order corresponding to the route record. Therefore, in the link list Lb5, multiple sets of link records, each set corresponding to a string of links to form one segment, are arrayed in an order in which the multiple segments corresponding to the multiple sets of links records are arrayed in the segment list Lb4 (see FIGS. 6B and 7). Regarding a route that is not the main road, the link records corresponding to this route are arrayed in the link list Lb5 in an order corresponding to a string of links forming this route.

As shown in FIG. 7, there are link records corresponding to links that do not form segments because of the order of road ranks. These link records are placed on a terminal point of the link list Lb5. The link records forming the segments are placed at a beginning of the link list Lb5. Because of this, the route record may have the following description: the link list array number and the link count instead of the segment list array number and the segment count. In this case, from the segment record count B4, it can be determined whether the description of the route record conforms to the segment list array number and the segment count or conforms to the link list array number and the link count. That is, if the described array number is smaller than or equal to the segment record count B4, the description conforms to the segment list array number. If the described array number exceeds the segment record count B4, the description conforms to the link list array number.

Similarly to the segment records and the link records, the coordinate records for the points on the route corresponding to the route record are arrayed in the coordinate list Lb6 in an order corresponding to the route record (see FIGS. 6B and 7).

<1.2.9 Link Connection Relation>

A description manner of the connection relation between links will be described. As described above, in the link record of the present embodiment, the information about only a single link connected to the corresponding terminal point (starting point or end point) is described as each of the "information representing the connection relation with another link connected to the starting point of the link" and the "information representing the connection relation with another link connected to the end point of the link." The present embodiment assumes that the information representing the connection relation with the other link at the terminal point of the link is information representing only a single link based on a specific rule as a connection counterpart. This differs from conventional map data (e.g., KIWI format) that uses node data to describe information about all links connected to a pertinent node.

Specifically, according to the present embodiment, a link record for each of links connected to the same node describes the connection relations between links connected to the same node in a clockwise direction. That is, the link record describes the link list array number of a certain link as a connection link number (starting point side connection link number or end point side connection link number). The certain link is a link that is adjacent in a clockwise direction around the node. When map data is used, the link records are referenced clockwise around the node to specify the links connected to the same node.

Figure 8A:
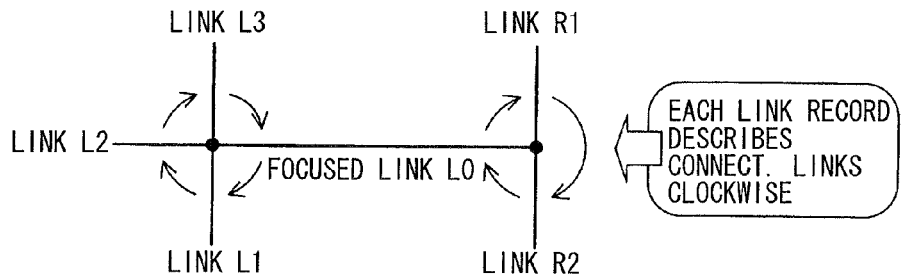
FIGS. 8A to 8C are explanatory diagrams concerning a connection relation between links represented by link records.
Figure 8B:
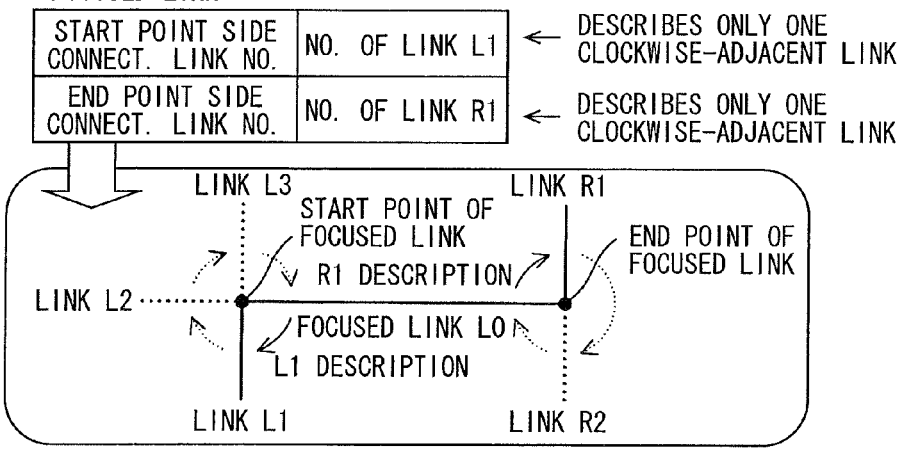

FIG. 8A shows an example of the connection relation and the direction of describing connection link numbers. The example describes the connection relation with the other links at the starting point and the end point of a focused link L0 as follows. FIG. 8B shows the starting point side connection link number and the end point side connection link number described in the link record for the focused link L0 shown in FIG. 8A. In this example, the other links L1, L2, and L3 are connected to the starting point of the focused link L0. Of the links L1, L2, and L3, the link L1 clockwise adjoins the focused link L0. Accordingly, the link record for the focused link L0 describes the link list array number of the link L1 as the starting point side connection link number.

The other links R1 and R2 are connected to the end point of the focused link L0. Of the links R1 and R2, the link R1 clockwise adjoins focused link L0. Accordingly, the link record for the focused link L0 describes the link list array number of the link R1 as the end point side connection link number.

Figure 8C:
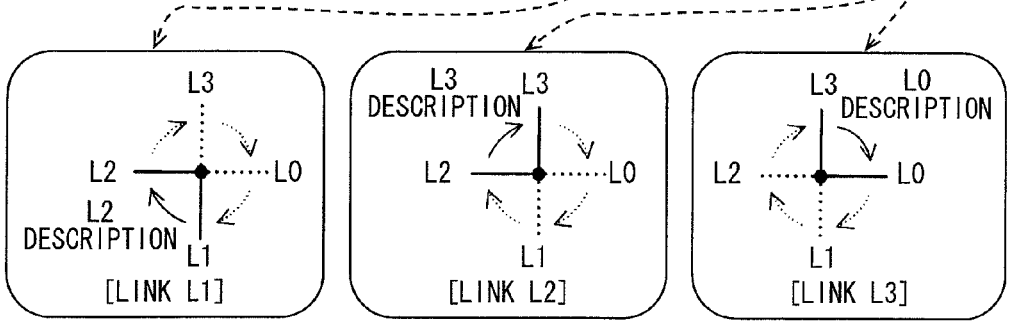

Based on the example of FIG. 8A, FIG. 8C shows connection link numbers described in the link records for the links L1, L2, and L3. The link L2 adjoins the link L1 clockwise around the starting point of the focused link L0. Accordingly, the link record for the link L1 describes the link list array number of the link L2 as the connection link number (starting point side connection link number or end point side connection link number) for the starting point or the end point of the link L1 corresponding to the starting point of the focused link L0. The link L3 clockwise adjoins the link L2. Accordingly, the link record for the link L2 describes the link list array number of the link L3 as the connection link number for the starting point or the end point of the link L2 corresponding to the starting point of the focused link L0. The link L0 clockwise adjoins the link L3. Accordingly, the link record for the link L3 describes the link list array number of the link L0 as the connection link number for the starting point or the end point of the link L3 corresponding to the starting point of the focused link L0.

The present embodiment uses the above-mentioned description to represent the link connection relation at the starting point of the focused link L0. The link record for each of links connected with each other at the same point describes information about a single link as a connection counterpart in order to provide information representing the connection relation with the other link. The description complies with a rule that enables to thoroughly reference the information representing the connection relation with the other link regarding all the links connected to the same point when the information representing the connection relation with the other link is used as a basis to sequentially reference the information representing the connection relation with the other link contained in the link record for the connection counterpart.

The present embodiment provides the above-mentioned method of representing the link connection relation. Accordingly, map data does not require node data for representing the link connection relation and can be designed as a simple structure.

<1.3 Summary of Map Data>

While there has been described the map data structure, the present embodiment uses the array string of route records, the array string of segment records, the array string of link records, and the array string of coordinate records to array the records along the route. The map data associates records with each other between different data lists using the information about array numbers of the records and the number of records in the data list without using a link ID or a node ID for conventional map data. Accordingly, the map data structure enables efficient access to records in the data lists and improves editability of the map data.

For example, let us suppose that a new road is added and a route record, a segment record, a link record, and a coordinate record are accordingly added. In this case, adding a record to the data list changes array numbers for the subsequent records in the data list from the position where the new record is added. Adding a record requires correcting the correspondence of records between the data lists. However, the present embodiment can accurately correct the correspondence using simple mathematic calculation to correct the array numbers to be referenced. The present embodiment can easily correct the correspondence between the records and improve the editability of map data. In other words, the present embodiment regularly corrects reference numbers (array numbers) in accordance with a change in the list array without using a link ID or a node ID that is used for conventional map data. The present embodiment can easily correct the correspondence between the records and improve the editability of map data. The present embodiment assumes each mesh-based data to be closed data. Correction of data in a mesh has only a limited effect on adjacent meshes.

The present embodiment uses the map data structure that uses link data to manage the information representing the connection relation between links at each node without independently managing link data and node data like conventional map data. Even when a new road is added, the present embodiment eliminates the need to make correspondence between link data and node data and can solve a complication concerning this correspondence.

In addition, the present embodiment does not adopt a conventional map data structure that provides hierarchical road data according to levels of detail in road networks. Instead, in the present embodiment, information about higher-level-layer road networks is compiled into a single mesh-based data with use of the concept of the segment. Specifically, the segment is defined as a replacement for the high-order link and contains a link string separated at least by intersections with road networks corresponding to main roads. The segment record describes the information capable of specifying a link record for the corresponding link string. Reference to the link record can specify road attributes of segments or the connection relation between segments equivalent to high-order links without providing multilayer road data.

The present embodiment eliminates the need for multilayer road data containing information about a newly added road when map data is edited for that road. The present embodiment eliminates the need to make correspondence between a high-order link and a low-order link or between a high-order node and a low-order node and can solve a complication concerning map data editing. The map data structure of the present embodiment can omit correspondence between hierarchical data and correspondence between link data and node data when map data is edited. Data editability improves dramatically.

The present embodiment uses the above-mentioned simple map data structure and therefore enables more efficient access to targeted information than simply connecting multilayer road data. In addition, the present embodiment improves data accessibility also because records are arrayed in the order of frequently accessed road ranks. The present embodiment enables efficient access to targeted record also because records are preferentially designed to be fixed-length.

In addition, the present embodiment can suppress the total size of map data because node data or hierarchical road data is unneeded.

<2. Navigation System Configuration>

The following describes a navigation system 10 installed with the map data according to the above-mentioned configuration. The navigation system 10 is an example of electronic apparatus <2.1 Basic Configuration>

Figure 9:
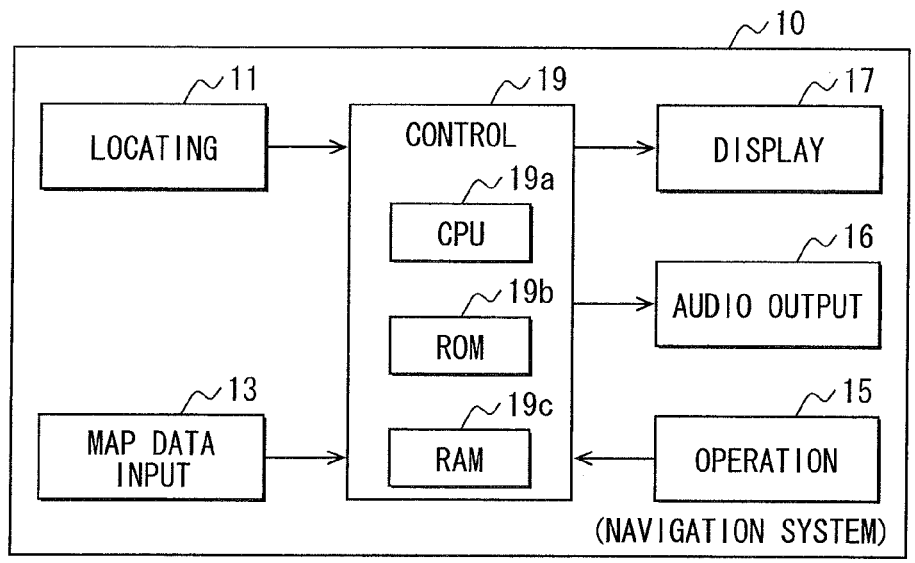
FIG. 9 is a block diagram illustrating a configuration of a navigation system.

The navigation system 10 shown in FIG. 9 includes a position detection device 11, a map data input device 13, an operation device 15, an audio output device 16, a display device 17, and a control circuit 19. The position detection device 11 detects the current position of a vehicle mounted with the navigation system 10. For example, the position detection device 11 includes a gyroscope, a distance sensor, and a GPS receiver based on known technologies.

The map data input device 13 includes or acts as a storage medium (such as a hard disk or DVD) storing the above-mentioned map data and is capable of supplying the map data stored in the recording medium to the control circuit 19.

The operation device 15 supplies a user instruction to the control circuit 19 and includes a touch panel provided for the display device 17 and operation switches provided on the body surface of the navigation system 10 and on a remote controller. Using the operation device 15, a user can perform all operations for the navigation system 10 such as changing map scales, scrolling a map, and specifying destination points.

The audio output device 16 includes a speaker, receives a signal from the control circuit 19, and outputs guidance audio to the user. The display device 17 is capable of full-color display. For example, the display device 17 displays a current position mark and a guide route so as to be overlaid on a map image based on the map data. The current position mark indicates the current position of the vehicle detected by the position detection device 11. The map data is supplied from the map data input device 13.

The control circuit 19 is configured similarly to a known microcomputer and includes a CPU 19a, ROM 19b, RAM 19c, I/O, and a bus line connecting these components. The CPU 19a performs processes based on signals (information) supplied from the position detection device 11, the map data input device 13, and the operation device 15 in accordance with a program stored in the ROM 19b. Specifically, the CPU 19a performs the program and the control circuit 19 accordingly reads map data from the map data input device 13 to interpret a road network and performs processes such as map display, route search, and route guidance.

<2.2 Route Search Process>

Figure 10:
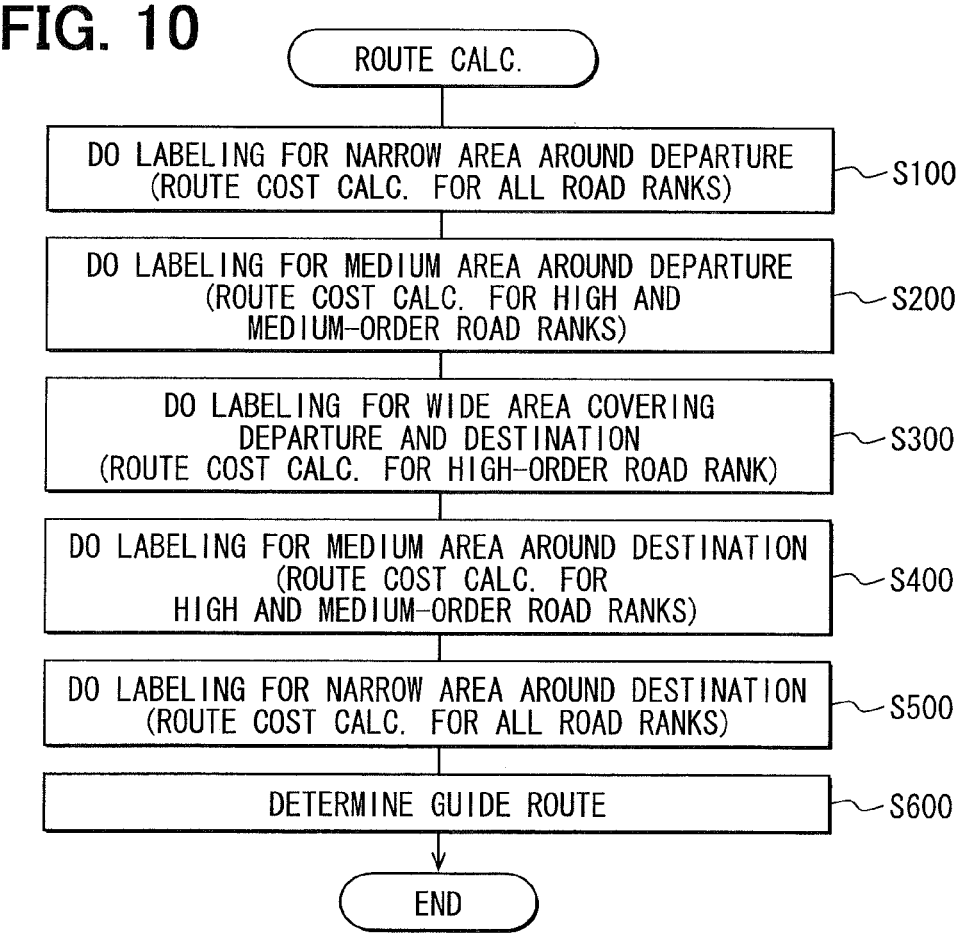
FIG. 10 is a flowchart illustrating a route calculation process performed by a control circuit.
Figure 11:
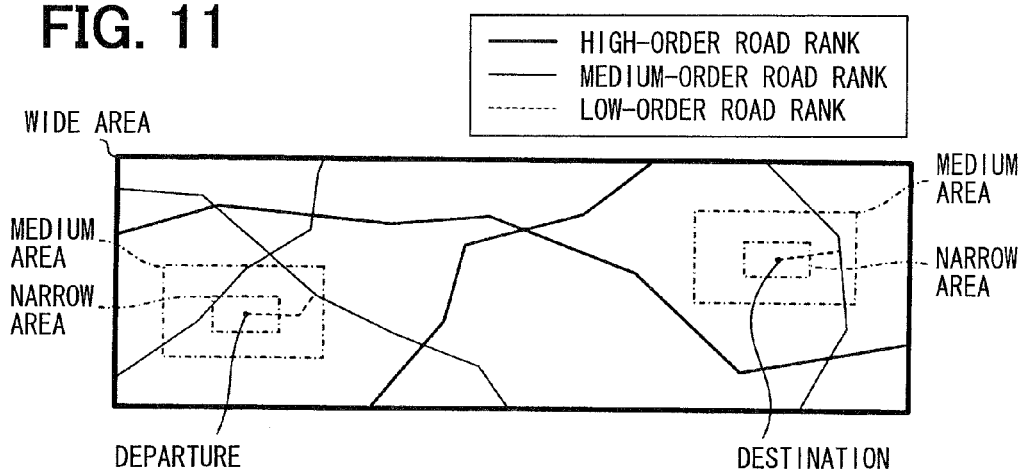
FIG. 11 is diagram illustrating areas from a departure point to a destination point.

The operation device 15 determines a destination point and supplies an instruction signal for performing the route search from the current place as a departure point to the destination point. The control circuit 19 then performs a route search process. The following describes a simple example of the route search process with reference to FIGS. 10 to 17. FIG. 10 is a flowchart exemplifying the route search process.

When the route search process starts, the control circuit 19 performs a labeling process for a narrow area (see FIG. 11) around the departure point (S100). The process applies the route search to links contained in the narrow area around the departure point regardless of the road rank types and calculates route costs from the departure point to nodes corresponding to the connection points for the links. A known method is used to calculate route costs and a detailed description is omitted for simplicity. The labeling process calculates route costs up to nodes capable of providing an optimum route from the departure point to the destination point and labels the nodes with the route costs. The labeling process is based on the basic known technology. The following describes processes specific to the above-mentioned map data structure of the present embodiment and a description about the other processes is omitted as needed.

After the process at S100, the control circuit 19 performs the labeling process for a medium area (see FIG. 11) around the departure point (S200). The process applies the route search to segments that are contained in the medium area around the departure point and belong to the high-order and medium-order road ranks. The process inherits the result from the labeling process at S100, calculates route costs up to the nodes (segment connection points), and labels the nodes with the route costs.

It should be noted that the process at S200 applies the route search to segments, not to links. The high-order and medium-order road ranks correspond to preferences that apply higher orders to road ranks more capable of high-speed running. The high-order and medium-order road ranks are applicable to "toll road," "national highway," "prefectural highway," "ordinary road," and "narrow street" when they are categorized into three orders. For example, segments may be defined for "toll road," "national highway," and "prefectural highway" as follows. "Toll road" and "national highway" may be defined as the high-order road rank. "Prefectural highway" may be defined as the medium-order road rank. "Ordinary road" and "narrow street" may be defined as the low-order road rank. Alternatively, segments may be defined for "toll road," "national highway," "prefectural highway," and "ordinary road" as follows. "Toll road" and "national highway" may be defined as the high-order road rank. "Prefectural highway" and "ordinary road" may be defined as the medium-order road rank. "Narrow street" may be defined as the low-order road rank.

After the process at S200, the control circuit 19 performs the labeling process for a wide area (see FIG. 11) containing the departure point and the destination point (S300). The process excludes segments belonging to the medium-order road rank from the route search and applies the route search to segments that are contained in the wide area and belong to the high-order road rank. The process inherits the result from the labeling process at S200 and calculates route costs up to the nodes (segment connection points). The process labels the nodes with the route costs up to the nodes.

After the process at S300, the control circuit 19 performs the labeling process for a medium area (see FIG. 11) around the destination point (S400). The process applies the route search to segments that are contained in the medium area around the destination point and belong to the high-order and medium-order road ranks. The process inherits the result from the labeling process at S300, calculates route costs up to the nodes (segment connection points), and labels the nodes with the route costs.

After the process at S400, the control circuit 19 performs the labeling process for a narrow area (see FIG. 11) around the destination point (S500). The process applies the route search to links that are contained in the narrow area around the destination point and belong to all the road ranks. The process calculates route costs up to the destination point.

After the process at S500, the control circuit 19 determines an optimum route as a guide route from the departure point to the destination point based on the so far process results (S600) and terminates the route search process. The control circuit 19 then performs a route guidance process appropriate for the vehicle movement in accordance with information about the optimum route (guide route). In addition to the above-mentioned technique, there is known another technique of route search from the departure point to the destination point. The technique performs the labeling process from the departure point and the destination point concurrently. Such a technique may replace the above-mentioned route search process.

Figure 12:
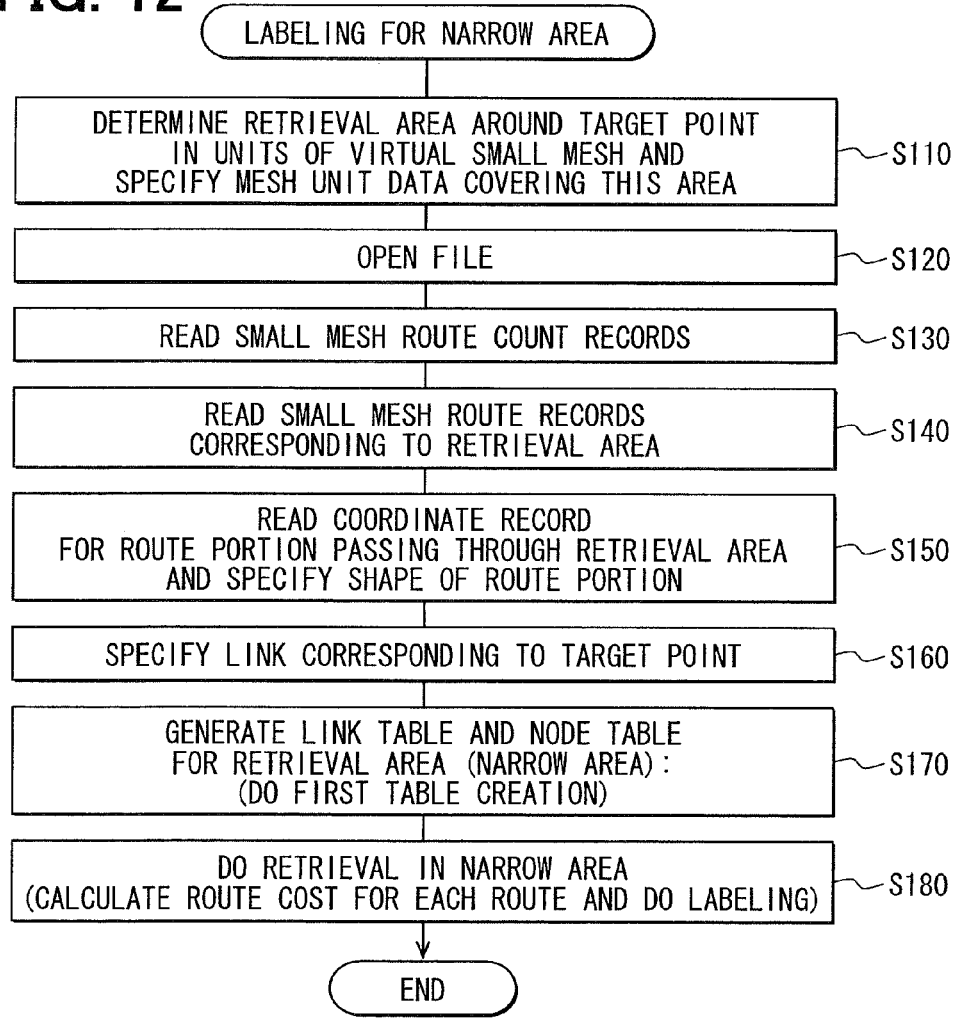
FIG. 12 is a flowchart illustrating a labeling process for a narrow area.
Figure 13:
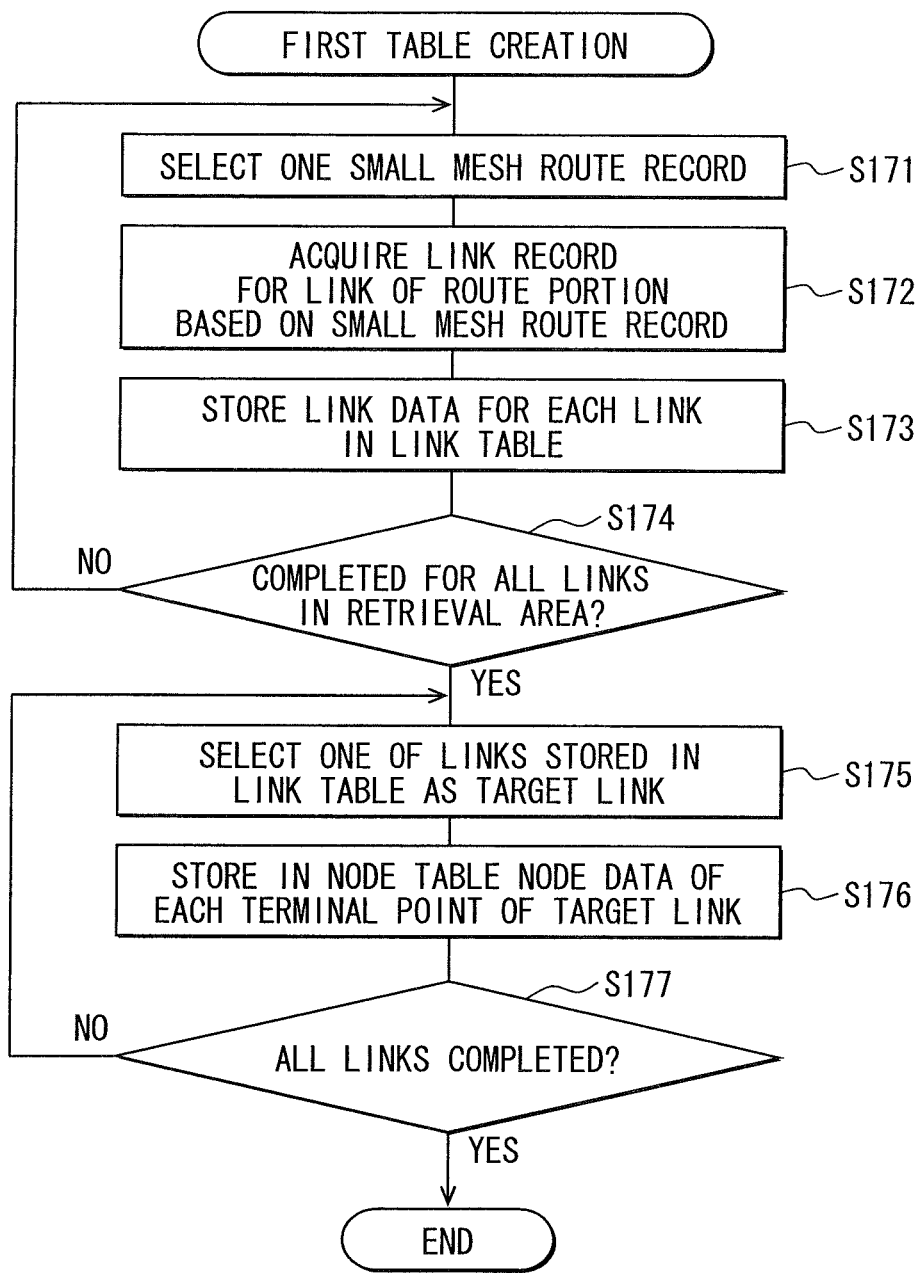
FIG. 13 is a flowchart illustrating a first table creation process.

With reference to FIG. 12, the following describes in detail the labeling process performed at S100 and S500 for the narrow area (see FIG. 11) around the departure point or the destination point. In the following description, the departure point or the destination point is expressed as a target point.

When the labeling process starts for the narrow area around the target point, the control circuit 19 settles a narrow route search area (narrow area) around the target point in units of virtual small meshes (S110). When the target point is positioned near the center of the virtual small mesh, for example, the control circuit 19 may settle a virtual small mesh containing the target point to be the route search area (narrow area). When the target point is positioned at an edge of the virtual small mesh, the control circuit 19 may settle areas corresponding to four virtual small meshes around the target point to be the route search areas (narrow areas). In addition, the route search area (narrow area) may be changed depending on whether an area around the target point is urban or suburban.

At S110, the control circuit 19 specifies mesh-based data corresponding to a mesh containing the settled route search area (narrow area). When the settled narrow area extends over multiple meshes, the control circuit 19 specifies mesh-based data corresponding to each of the meshes. At S120, the control circuit 19 opens the specified mesh-based data (data file) and makes records in the mesh-based data readable.

The control circuit 19 reads the small mesh route count record corresponding to each of the virtual small meshs in the mesh from the mesh-based data and specifies the small mesh route count corresponding to each of the virtual small meshs (S130). Further, the control circuit 19 reads a group of small mesh route records corresponding to the virtual small meshs in the narrow area based on the information about the small mesh route count (S140). The control circuit 19 reads coordinate records for a route passing through the virtual small meshs based on each of the read-out small mesh route records and thereby specifies a shape of the route passing through the narrow area (S150). The control circuit 19 specifies a link corresponding to the target point based on the coordinates of the target point and the specified route shape (S160). The link is specifiable based on the correspondence relation between a coordinate record and a link record.

Upon completion of the process at S160, the control circuit 19 interprets a road network for the narrow area corresponding to the target point based on the mesh-based data and generates a link table and a node table representing the road network for the narrow area (S170). Specifically, the control circuit 19 performs the first table creation process shown in FIG. 13.

When the first table creation process starts, the control circuit 19 selects one of the small mesh route records (read at S140) corresponding to the narrow area as a process target record (S171). Based on the contents of the process target record, the control circuit 19 specifies a link string corresponding to the route portion indicated by the process target record and reads link records corresponding to the link string from the link list Lb5 (S172). Based on the read-out link records, the control circuit 19 stores link data for route search in the link table for narrow area in the RAM 19c according to each of the links corresponding to the read-out link records (S173). The link data describes a road attribute of the link needed for the route search and does not contain information about the node such as the link connection relation. FIG. 14A is a configuration diagram showing the link table (and the segment table). Care should be taken not to store duplicate link data in the link table.

The control circuit 19 repeatedly performs the process at S171 to S173 on the small mesh route records that are read at S140 and correspond to the narrow area. The control circuit 19 thereby stores link data in the link table concerning all links corresponding to the narrow area. Upon completion of this process (Yes at S174), the subsequent process at S175 to S177 generates a node table corresponding to the road network for the narrow area.

Specifically, the control circuit 19 selects one of the links stored in the link table as a process target link (S175). The control circuit 19 specifies all links connected to both terminal points of the process target link based on the link records for the process target link. The control circuit 19 then stores node data in the node table for each of the terminal points (S176). The node data describes link connection information that contains link list array numbers of the links connected to each other including the process target link.

In more detail, at S176, the control circuit 19 clockwise references link records for the links connected to the starting pint of the process target link based on starting point side connection link numbers contained in the link records for the process target link. The control circuit 19 thereby specifies link list array numbers for the links connected to the starting point of the process target link. As shown in FIG. 14B, the control circuit 19 stores node data for the starting point in the node table for narrow area in the RAM 19c. The node data contains: the number of links connected to the node; link connection information containing link list array numbers (including the link list array number of the process target link) for the links connected to each other at the node; node position coordinates specified from the coordinate record; and a road attribute (e.g., availability of a traffic light) of the node specified from the link record for the process target link. Care should be taken not to store duplicate node data in the node table. FIG. 14B shows a configuration of the node table.

Similarly, at S176, the control circuit 19 specifies link list array numbers of the links connected to the end point for the process target link based on end point side connection link numbers contained in the link records for the process target link. The control circuit 19 stores node data for the starting point in the node table. This node data also has the structure similar to that described above.

The control circuit 19 repeatedly performs the process at S175 and S176 (No at S177). The control circuit 19 then terminates the first table creation process when node data for all links have been stored in the node table (Yes at S177).

The control circuit 19 then proceeds to S180 and performs the route search in the narrow area using the link table and the node table. Specifically, the control circuit 19 calculates route costs for the routes and performs the labeling process. The control circuit 19 then terminates the labeling process for the narrow area shown in FIG. 12. Known route search methods include Dijkstra's algorithm.

Figure 15:
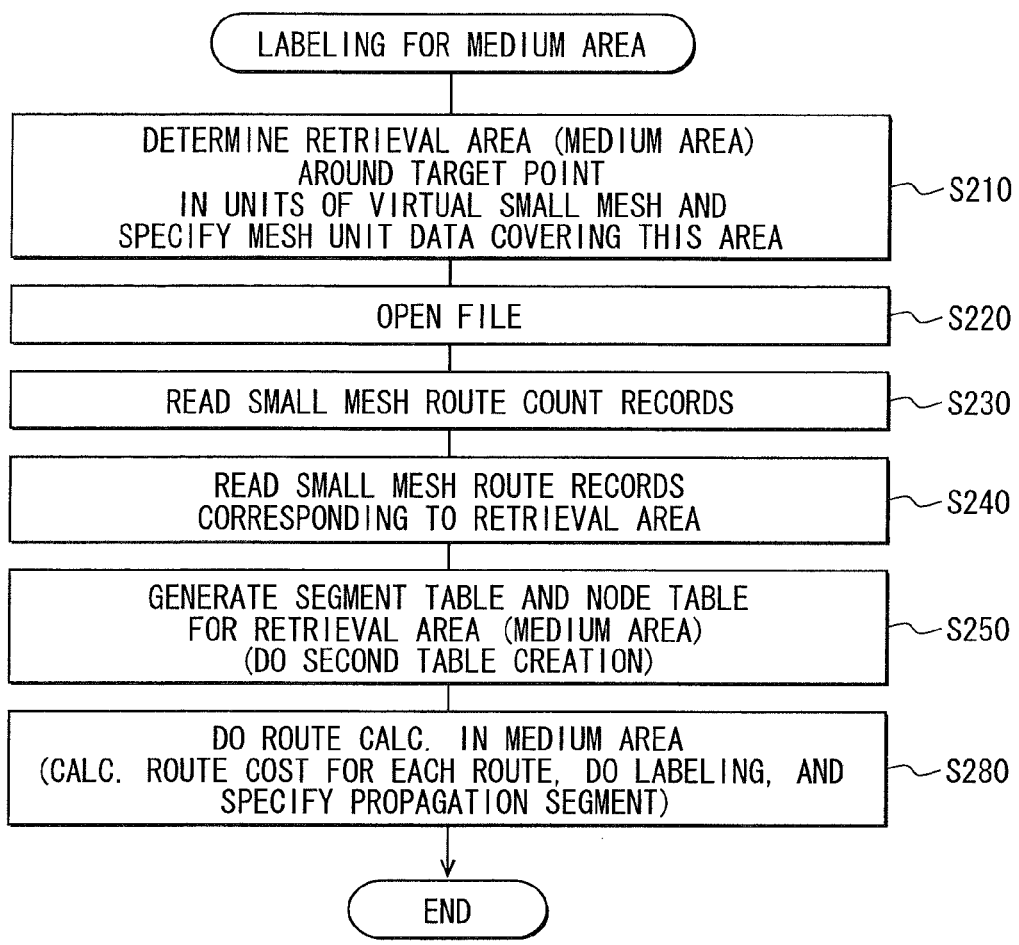
FIG. 15 is a flowchart illustrating a labeling process for a medium area.
Figure 16:
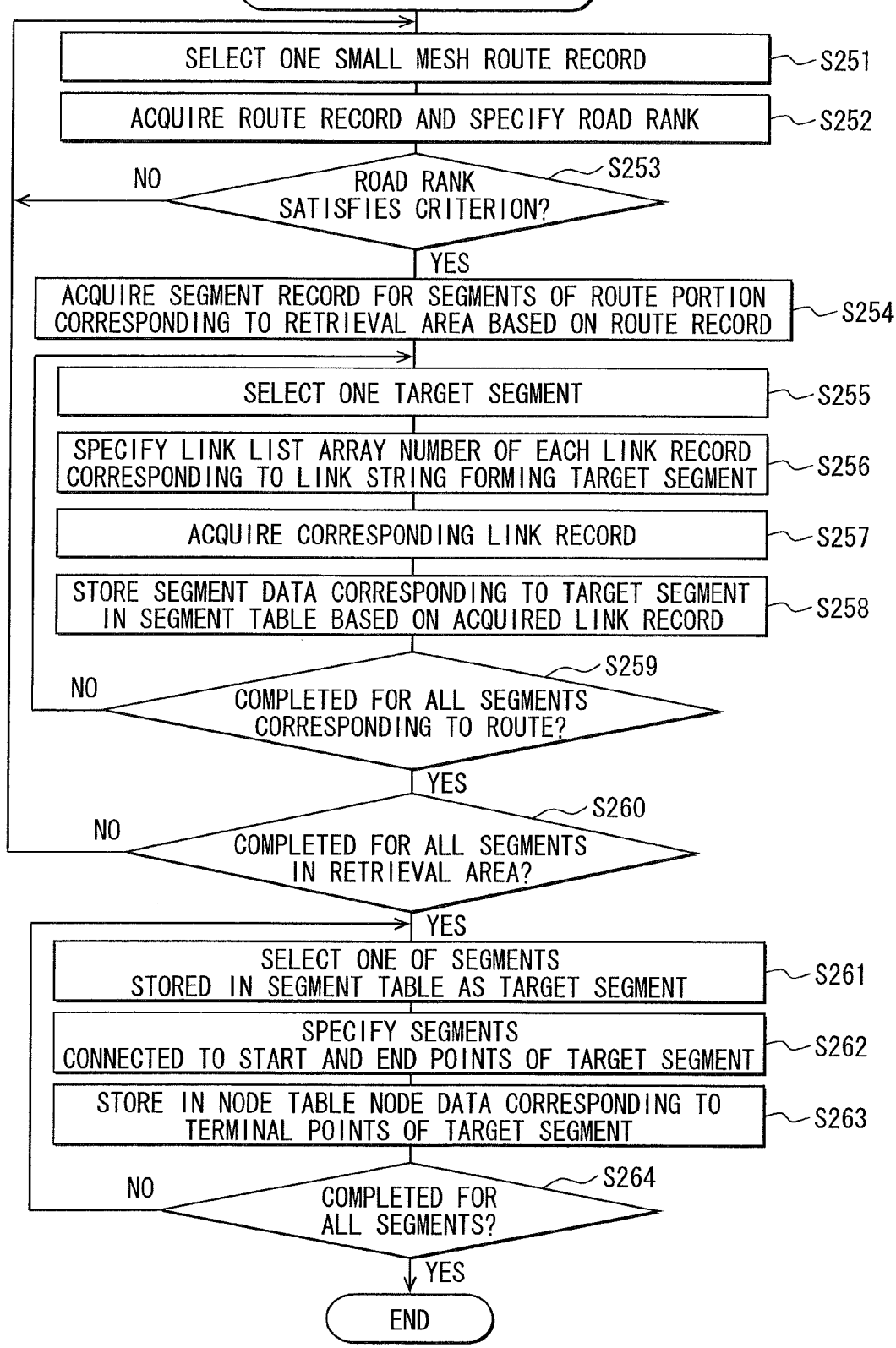
FIG. 16 is a flowchart illustrating a second table creation process.

With reference to FIG. 15, the following describes in detail the labeling process for the medium area performed by the control circuit 19 at S200 and S400.

When the labeling process for the medium area around the target point starts, the control circuit 19 settles a medium route search area (medium area) around the target point in units of virtual medium meshs (S210). This process can settle the route search area (medium area) using the same technique as used to settle the narrow area in units of virtual medium meshs instead of virtual small meshs.

At S210, the control circuit 19 specifies mesh-based data corresponding to a mesh containing the settled route search area (medium area). When the settled medium area extends over multiple meshes, the control circuit 19 specifies mesh-based data corresponding to each of the meshes. At S220, the control circuit 19 opens the specified mesh-based data (data file) and makes records in the mesh-based data readable.

The control circuit 19 reads the small mesh route count record corresponding to each of the virtual small meshs in the mesh from the mesh-based data and specifies the small mesh route count corresponding to each of the virtual small meshs (S230). In accordance with the contents, the control circuit 19 reads a group of small mesh route records corresponding to the virtual small meshs in the medium area (S240). The control circuit 19 interprets a road network of main roads according to segment connections in the medium area corresponding to the target point based on the read-out small mesh route records and generates a segment table and a node table representing the road network for the medium area (S250). Specifically, the control circuit 19 performs the second table creation process shown in FIG. 16.

When the second table creation process starts, the control circuit 19 selects one of the small mesh route records (read at S240) corresponding to the medium area as a process target record (S251). The control circuit 19 reads a route record corresponding to the route portion represented by the process target record (S252). The control circuit 19 specifies a road rank corresponding to the route portion represented by the process target record (S252). The control circuit 19 determines whether the road rank contains segment data (S253). In other words, the control circuit 19 determines whether the road rank is high-order or medium-order. When the road rank is determined to contain no segment data (No at S253), the control circuit 19 proceeds to S251 and changes the process target record. When the road rank is determined to contain segment data (Yes at S253), the control circuit 19, based on the route record, reads segment data for the segments configuring the route portion corresponding to the process target record (S254).

The control circuit 19 selects one process target segment from the segments corresponding to the above-mentioned read-out segment data (S255). The control circuit 19 specifies the link list array number for each of the link records corresponding to the link string configuring the process target segment in accordance with the above-mentioned "link list array number of the link record corresponding to the link at the beginning of a link string configuring the segment" and the "number of links configuring the segment" described in the segment data (S256). According to the contents, the control circuit 19 acquires the link record for each of links configuring the segment and specifies the road attribute for the process target segment from the description in the acquired link record (S257).

According to the contents, the control circuit 19 stores in the segment table the segment data for medium area in the RAM 19c (S258). The segment data describes a road attribute of the process target segment and compiles data needed for the route search. FIG. 14A shows the segment table configuration. The segment data stored in the segment table has basically the same data structure as that of the link data stored in the link table. Care should be taken not to store duplicate segment data in the segment table.

The control circuit 19 repeatedly performs the process at S251 to S258 on the small mesh route records that are read at S240 and correspond to the medium area. The control circuit 19 thereby stores segment data in the segment table concerning all segments corresponding to the medium area. Upon completion of this process (Yes at S260), the subsequent process at S261 to S264 generates a node table corresponding to the road network for the medium area.

Specifically, the control circuit 19 selects one of the segments stored in the segment table as a process target segment (S261). The control circuit 19 references the link record to specify a group of segments connected to both terminal points of the process target segment (S262).

Specifically, the control circuit 19 references the link record for the link at the terminal point of a link string configuring the process target segment toward the starting point of the segment and thereby specifies the starting point side connection link number described in the link record as the starting point side connection link number of the process target segment. Based on the starting point side connection link number, the control circuit 19 clockwise references link records for the links connected to the starting point of the process target segment, specifies the links connected to the starting point of the process target segment, and specifies a segment corresponding to the specified link. The control circuit 19 ignores a link to be connected when part of the link is equivalent to "narrow street" and contains no segment defined. That is, the road is assumed to have no branch (segment).

Similarly, the control circuit 19 searches the link string configuring the process target segment and receives an end point side connection link number described in the link record for the link at the end point of the segment, so that the retrieved end point side connection link number is specified as the end point side connection link number of the process target segment. Based on this information, the control circuit 19 specifies the segments connected to the end point of the process target segment.

According to the specified contents, the control circuit 19 stores node data corresponding to the starting point and that corresponding to the end point of the process target segment in the node table for medium area in the RAM 19c (S263). Care should be taken not to store duplicate node data in the node table. As shown in FIG. 14B, node data stored in the node table for medium area has the same structure as node data stored in the node table for narrow area except that the segment connection information is described instead of the link connection information.

At S263, the control circuit 19 stores node data corresponding to the starting point of the process target segment in the node table. The node data contains: the number of segments connected to the node; segment connection information containing segment list array numbers (including the segment list array number of the process target segment) for the segments connected to each other at the node; node position coordinates specified from the coordinate record; and a road attribute (e.g., availability of a traffic light) of the node specified from the link record for the process target segment. At S263, the control circuit 19 also stores node data corresponding to the end point of the process target segment in the node table. This node data has the same structure as that corresponding to the starting point described above.

The control circuit 19 repeatedly performs the process at S261 to S263 (No at S264). The control circuit 19 then terminates the second table creation process when node data for all segments have been stored in the node table (Yes at S264).

The control circuit 19 then proceeds to S280 and performs the route search in the medium area using the segment table and the node table. Specifically, the control circuit 19 inherits the result of route cost calculation performed by the preceding labeling process, calculates route costs for the routes in the medium area around the target point, and labels the costs. The control circuit 19 then terminates the labeling process for the medium area shown in FIG. 15.

Figure 17:
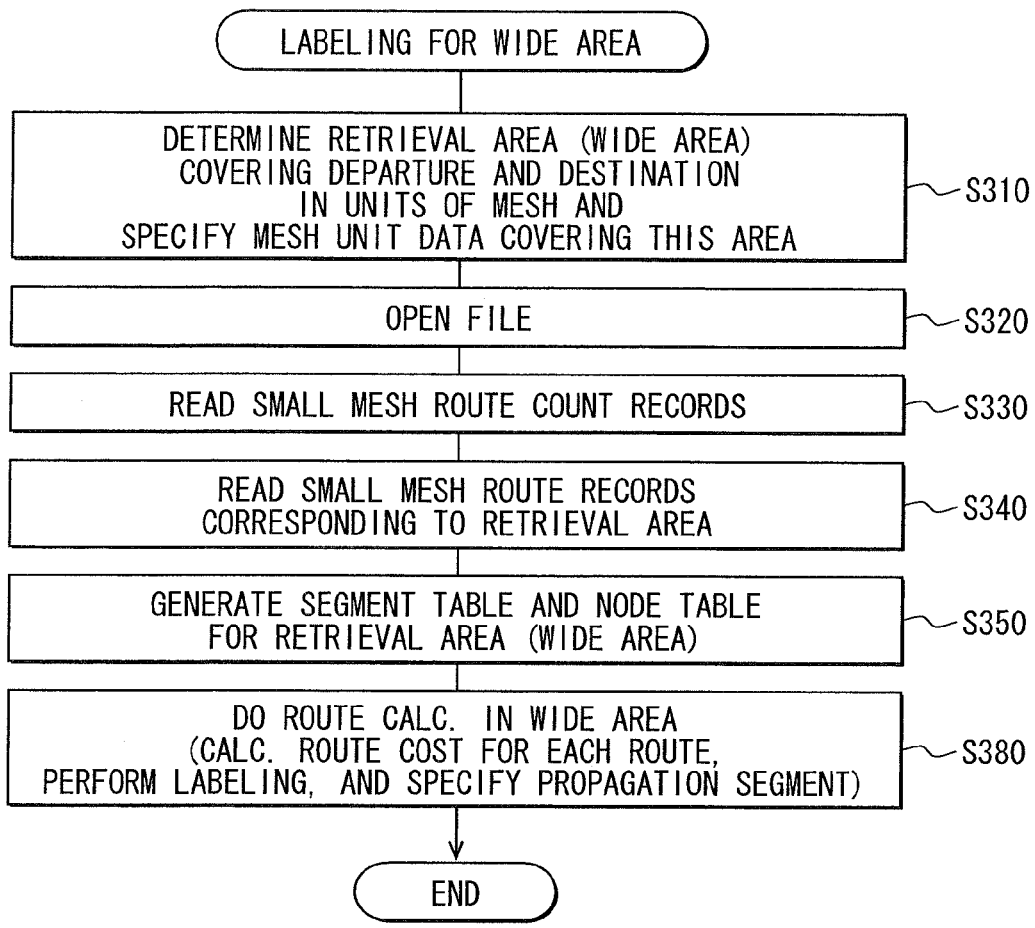
FIG. 17 is a flowchart illustrating a labeling process for a wide area.

With reference to FIG. 17, the following describes in detail the labeling process for the wide area performed by the control circuit 19 at S300. When the labeling process for the wide area starts, the control circuit 19 settles a continuous stretch of wide route search area (wide area) including the departure point and the destination point in units of meshes (S310). The control circuit 19 opens a group of mesh-based data corresponding to the wide area and makes records in each mesh-based data readable (S320).

The control circuit 19 then reads a group of small mesh route count records from the mesh-based data. The control circuit 19 specifies a small mesh route count corresponding to each of the virtual small meshs (S330). Based on the contents, the control circuit 19 reads small mesh route records corresponding to the virtual small meshs belonging to the wide area (S340). Based on the small mesh route records, the control circuit 19 generates a segment table and a node table representing road networks in the wide area (S350). Specifically, the control circuit 19 performs a process similar to the second table creation process shown in FIG. 16 and generates the segment table and the node table for wide area in the RAM 19c. At S253, however, the control circuit 19 determines whether the road rank corresponding to the route portion indicated by the process target record contains segment data and whether the road rank is high-order. When the road rank is high-order, the control circuit 19 branches to the affirmative result (Yes at S253) and proceeds to S254. Otherwise, the control circuit 19 branches to the negative result (No at S253) and proceeds to S251.

After generating the segment table and the node table for wide area, the control circuit 19 proceeds to S380 and performs the route search in the wide area based on the segment table and the node table. Specifically, the control circuit 19 inherits the result of route cost calculation performed by the preceding labeling process, calculates route costs for the routes in the wide area based on the segment table and the node table, and labels the costs. The control circuit 19 then terminates the labeling process for the wide area shown in FIG. 17.

<2.3 Correspondence Relation?

While there have been described the configurations of the navigation system 10, the control circuit 19 performs the first table creation process and the second table creation process. The first table creation process corresponds to an example of the process implemented by a first interpretation means or section. The second table creation process corresponds to an example of the process implemented by a second interpretation means or section. The process performed by the control circuit 19 at S180, S280, S380, and S600 corresponds to an example of the process implemented by a route search means or section.

<3. Modifications>

The above-described embodiments do not limit embodiments and can be modified in various ways. For example, the above-mentioned map data structure is also applicable to not only a navigation systems mounted on a vehicle but also other devices, e.g., mobile terminals such as mobile telephones and the like.

<Aspects>

The present disclosure has various aspects. For example, according to a first aspect, a map data having the following structure is provided. The map data comprises a link data that describes a characteristic of each link in a group of links on a link-by-link basis. The group of links forms a road network. The map data further comprises a segment data that relates to each segment in a group of segments on a segment-by-segment basis. Segments are defined in units of link string. Each link string is a string of multiple links and corresponds to a main road. Each link string terminates at least at an intersection of the main road. The multiple links are a part of the group of links. The segment data of each segment describes information on a storage destination of the link data corresponding to the link string that forms the each segment.

According to the above map data, by referencing the segment data for a segment, it is possible access the link data relating to the segment, and it is possible to comprehend characteristics of respective links forming the segment. For example, if the link data stores information on road length, traffic regulation or the like, it is possible to acquire the information on road length, traffic regulation or the like by accessing to the link data.

Therefore, according to the above map data, it is possible to efficiently access to a desired data according to levels of detail of road network without providing road data for respective multiple levels. Data accessibility of map data improves. Additionally, it becomes possible to simplify the structure of the map data and it becomes possible to reduce retention of duplicative data. Therefore, editability of the map data improves.

The map data may be configured as follows. The link data includes information on a connection relation with another link in the road network.

In this case, the road network can be provided as a main road network and a detailed road network. The main road network corresponds to the main road. The detailed road network describes the road network in details including the main road. In the map data, the main road network is represented by the group of the segment data using the part of the group of the link data. In the map data, the detailed road network is represented by the group of the link data. According to this map data, by referencing the segment data for a segment, it is possible to access to the link data relating to the segment and it is possible to efficiently comprehend a connection relation of the map road.

Furthermore, the map data may be configured as follows. The map data stores a group of the link data in form of a link list, in which the group of the link data is arrayed. The map data stores a group of the segment data in form of a segment list, in which the group of the segment data is arrayed. The link list is configured so that the multiple links, which are the link string forming each segment, are collectively arrayed in an order corresponding to the link string. The segment data is configured so that the information on the storage destination includes an array number of a particular link data in the link list, the particular link data corresponding to one link positioned at a terminal point of the link string.

For example, the array number of a particular link data in the link list included in the information on the storage destination may be the array number of a link data for a link positioned at a terminal point of the link string or may be the number numbers of link data for links positioned at both terminal points of the link string. Since data of the link string corresponding to the segment are stored in the link list an order of arrangement of the multiple links in the link string, all of the link data of the multiple links forming the segment can be specified from the above information on the storage destination.

If the array number of a link data corresponding to a link positioned at one of the opposite terminal points of the link string, the link string forming the link the segment cannot specified without referencing a segment data corresponding to an adjacent segment.

Thus, the above map data may be configured in the following way. The information on the storage destination described in the segment data further includes a number of links forming the link string in addition to the array number of the particular link data in the link list.

When the segment data is configured in the following way, it is possible to specify data of respective links forming the link string corresponding to the segment, without referencing the segment data corresponding to the adjacent segment. Data accessibility improves.

The above map data may be configured in the following way. In the link list, the group of the link data is arrayed by being collectively classified according to road type. When the link data belongs to a road type appropriate for higher-speed travel, the link data is closer to a top of the link list. In the segment list, the group of the segment data are arrayed while being classified according to road type. When the segment data belongs to the road type appropriated for higher-speed travel, the segment data is closer to a top of the segment list.

Since the link data and the segment data with the road rank appropriate for high-speed travel are typically referenced at a high frequency in route calculation, the above-described configuration of the link list and the segment list improves data accessibility. The road types appropriate for higher speed travel include a toll road, a national highway, a prefectural highway and the like. The toll road is more appropriate for higher speed travel than the national highway, which is more appropriate for higher speed travel than the national highway.

The above map data may be configured in the following way. In the segment list, the group of the segment data each describing the information on the storage destination of the link data are arrayed in an order corresponding to an order in which the group of the link data are arrayed in the link list. When the link list and the segment list are grouped in the above-described way, the editability at update of the map data improves and the data accessibility improves.

According to a second aspect, a storage medium storing the above map data is provided. According to a third aspect, an electronic apparatus capable of reading the above map data from the storage medium storing therein the map data is provided. In the map data, the link data includes the information on the connection relation with another link in the road network. In this case, the electronic apparatus may be configured as follows.

Specifically, the electronic apparatus may comprises a first interpretation section and a second interpretation section. The first interpretation section interprets the detailed road network in the map data by (i) referencing each link data forming the map data, and (ii) specifying connection relations between links forming the detailed road network, based on the information of the link data representing the connection relation with the another link. The second interpretation section interprets the main road network in the map data by (i) referencing each segment data, which forms the map data, (ii) referencing the link data corresponding to the information on the storage destination described in the each segment data, based on the information on the storage destination information described in the each segment data, and (iii) specifying connection relations between links forming the main road network, based on the information of the link data representing the connection relation with the another link.

The electronic apparatus provided with the above first and second interpretation sections can appropriately use the above-described map data. The above electronic apparatus may be configured to further comprises a route calculation section that calculates a route from a departure point to a destination point, in such manner that: the route calculation section calculates a part of the route in a peripheral area around the departure point and the destination point by using the detailed road network interpreted by the first interpretation means; and the route calculation section calculates another part of the route in an area from the departure point to the destination point except the peripheral area by using the main road network interpreted by the second interpretation section. This electronic apparatus can achieve efficient route calculation.

It is to be noted that various changes and modifications will become apparent to those skilled in the art. Such changes and modifications are to be understood as being within the scope of the appended claims.

What is claimed is:

1. A non-transitory computer readable storage medium storing therein map data, the map data comprising:
   link data that describes a characteristic of each link in a group of links on a link-by-link basis, the group of links forming a road network; and
   segment data that relates to each segment in a group of segments on a segment-by-segment basis,
      a segment being defined for each link string, which is a string of multiple links, corresponding to a main road, which is any road that includes a highway, and
      no segment being defined for each link string corresponding to a non-main road, which is any road that does not include a highway, wherein
   each link string forming a segment terminates at least at an intersection of a main road, wherein
   the multiple links forming the group of segments are a part of the group of links forming the road network, and wherein
   segment data related to a particular segment describes information on a storage location of the link data corresponding to the link string that forms the particular segment.

2. The non-transitory computer readable storage medium according to claim 1, wherein:
   the map data stores a group of the link data in form of a link list, in which the group of the link data is arrayed;
   the map data stores a group of the segment data in form of a segment list, in which the group of the segment data is arrayed;
   the link list is configured so that the multiple links, which are the link string forming each segment, are collectively arrayed in an order of arrangement of the multiple links in the link string; and
   the segment data is configured so that the information on the storage destination includes an array number of a particular link data in the link list, the particular link data corresponding to one link positioned at an end of the link string.

3. The non-transitory computer readable storage medium according to claim 2, wherein:
   the information on the storage destination described in the segment data further includes a number of links forming the link string in addition to the array number of the particular link data in the link list.

4. The non-transitory computer readable storage medium according to claim 2, wherein:
   in the link list, the group of the link data is arrayed by being collectively classified according to road type;

when the link data belongs to a road type appropriate for higher-speed travel, the link data is closer to a top of the link list;

in the segment list, the group of the segment data are arrayed while being classified according to road type; and when the segment data belongs to the road type appropriated for higher-speed travel, the segment data is closer to a top of the segment list.

5. The non-transitory computer readable storage medium according to claim 2, wherein:

in the segment list, the group of the segment data each describing the information on the storage destination of the link data are arrayed in an order corresponding to an order in which the group of the link data are arrayed in the link list.

6. The non-transitory computer readable storage medium according to claim 1, wherein:

the link, data includes information on a connection relation with another link in the road network;

the road network is provided as a main road network and a detailed road network;

the main road network corresponds to the main road;

the detailed road network describes the road network in details including the main road;

in the map data, the main road network is represented by the group of the segment data using the part of the group of the link data; and in the map data, the detailed road network is represented by the group of the link data.

7. The non-transitory computer readable medium according to claim 1, wherein the map data is a single layer data for the road network.

8. The non-transitory computer readable medium according to claim 1, wherein the map data is installed in a navigation apparatus mounted on a vehicle.

* * * * *